(12) United States Patent
Takaku et al.

(10) Patent No.: US 7,348,044 B2
(45) Date of Patent: Mar. 25, 2008

(54) LIQUID CRYSTAL COMPOSITION AND LIQUID CRYSTAL ELEMENT

(75) Inventors: Koji Takaku, Minami-ashigara (JP); Takashi Katoh, Minami-ashigara (JP)

(73) Assignee: Fujifilm Corporation, Tokyo (JP)

( * ) Notice: Subject to any disclaimer, the term of this patent is extended or adjusted under 35 U.S.C. 154(b) by 22 days.

(21) Appl. No.: 11/410,929

(22) Filed: Apr. 26, 2006

(65) Prior Publication Data

US 2006/0263543 A1 Nov. 23, 2006

(30) Foreign Application Priority Data

Apr. 26, 2005 (JP) .............................. 2005-127981

(51) Int. Cl.
*C09K 19/52* (2006.01)
*C09K 19/60* (2006.01)

(52) U.S. Cl. ................ 428/1.1; 252/299.01; 252/299.1

(58) Field of Classification Search .................. 428/1.1; 252/299.01, 299.1, 299.5
See application file for complete search history.

(56) References Cited

U.S. PATENT DOCUMENTS 4,566,759 A * 1/1986 McDonnell et al. ........ 349/170
5,621,552 A * 4/1997 Coates et al. ................. 349/86
7,220,466 B2 * 5/2007 Katoh et al. ................. 428/1.1
2005/0218375 A1* 10/2005 Katoh et al. ........... 252/299.01
2006/0060822 A1* 3/2006 Takaku et al. .......... 252/299.01
2006/0269696 A1* 11/2006 Kato et al. .................... 428/1.1

OTHER PUBLICATIONS

M. Schadt, "Effects of dielectric relaxations and dual-frequency addressing on the electro-optics of guest-host liquid crystal displays," Appl. Phys. Lett. 41(8), Oct. 1982, pp. 697-699.
Bucher et al., "Frequency-Addressed Liquid Crystal Field Effect," Applied Physics Letters, vol. 25, No. 4, Aug. 1974, pp. 186-188.
D. Coates, Mol., "A Smectic A Phrase of Positive and Negative Dielectric Anisotropy," Cryst. Liq. vol. 49 (Letters) 1978, pp. 83-87.

* cited by examiner

*Primary Examiner*—Shean C Wu
(74) *Attorney, Agent, or Firm*—Birch, Stewart, Kolasch & Birch, LLP

(57) ABSTRACT

A novel smectic liquid crystal composition is disclosed. The smectic liquid crystal composition comprises at least, a dichroic dye, a dual-frequency switchable nematic liquid crystal and a smectic liquid crystal. The dielectric anisotropy of the composition changes from a positive value to a negative value with increasing a frequency of a field applied to the composition. A novel liquid crystal device is also disclosed. The device comprises a pair of electrodes of which at least one is a transparent electrode, and a layer between the pair of electrodes comprising the smectic liquid crystal composition.

16 Claims, No Drawings

LIQUID CRYSTAL COMPOSITION AND LIQUID CRYSTAL ELEMENT

This application claims benefit of priority under 35 USC 119 to Japanese Patent Application No. 2005-127981 filed Apr. 26, 2005.

BACKGROUND OF THE INVENTION

1. Technical field

The present invention relates to a liquid crystal composition and a liquid crystal device comprising a liquid crystal layer comprising the composition, and more particularly to a liquid crystal device advantageously usable in a liquid crystal device employing a guest-host (hereinafter also referred to as GH) mode.

2. Related art

A display device is required to have a high level of visibility and a low consumption of electric power. As one of display devices having such qualities, GH-mode display devices, capable of displaying brightly, have been known, and is expected as a high-quality display device employing a reflective mode.

A liquid crystal composition comprising a dichroic dye having a particular group and a host liquid crystal, and a liquid crystal device employing a GH-mode are disclosed in Japanese Laid-Open Patent Publication "Tokkai" No. 2004-75821.

The switching of the liquid crystal device is usually carried out by varying the alignment state while applying (ON) and not applying (OFF) an electric field to liquid crystal. The alignment variation of liquid crystal without an electric field is affected by a force of alignment layer, and, thus, the response speed may become to lower while not applying an electric field to liquid crystal.

A dual-frequency switching method has been known (see Applied Physics Letters, Vol. 25, No. 4, 186-188(1974); and Applied Physics Letters, Vol. 41, No. 8, 697-699(1982)). This method employs a dual-frequency switchable liquid crystal, of which dielectric constant anisotropy, $\Delta\epsilon$, changes from a positive value to a negative value with increasing the frequency of applied voltage, and therefore allows a reversible change of the liquid crystal alignment with an electrical field. According to this method, it is possible to carry out the switching in the manner that liquid crystal molecules change their alignment actively, and, thus, to improve the response speed. It is, however, impossible to store image information without an electrical field, and, thus, it is necessary to continue to apply voltage to liquid crystal for maintaining images.

As a dual-frequency switchable liquid crystal, there has been provided liquid crystal exhibiting a nematic phase (see Mol. Cryst. Liq. Cryst., 49, 83-87 (1978)).

It has been required to provide a liquid crystal device exhibiting a high displaying contrast and capable of storing image information.

SUMMARY OF THE INVENTION

One object of the present invention is to provide a liquid crystal composition which is useful for preparing a liquid crystal device exhibiting a high displaying contrast and capable of storing image information. Another object of the present invention is to provide a liquid crystal device exhibiting a high displaying contrast and capable of storing image information.

Generally, it has been considered that, although a GH-mode employing a dual-frequency switchable nematic liquid crystal shows a quick responsiveness, it cannot store image information without an electrical field, and, thus, it cannot show a low consumption of electric power to be required. The inventors conducted various studies, and, as a result, they found that mixing a mixture of dual-frequency switchable nematic liquid crystal with smectic liquid crystal can contribute to improving bistability. On the basis of the finding, they conducted further various studies, and the present invention was achieved.

In one aspect, the present invention provides a smectic liquid crystal composition comprising, at least, a dichroic dye, a dual-frequency switchable nematic liquid crystal and a smectic liquid crystal, wherein a dielectric anisotropy of the composition changes from a positive value to a negative value with increasing a frequency of a field applied to the composition.

As embodiments of the invention, there are provided the smectic liquid crystal composition wherein the smectic liquid crystal is dual-frequency switchable; and the smectic liquid crystal composition, wherein, being applied a field, a dielectric anisotropy of the smectic liquid crystal changes from a positive value to a negative value with increasing a frequency of the applied field.

The smectic liquid crystal may be selected from the group presented by a following formula (1):

$$T^1\text{-}\{(D^1)_e\text{-}L^1\}_m\text{-}(D^2)_k\text{-}T^2 \qquad \text{Formula (1)}$$

where "Het" represents an oxygen atom or a sulfur atom; $B^1$ and $B^2$ respectively represent a substituted or non-substituted arylene group, heteroarylene group or divalent cycloaliphatic hydrocarbon group; $Q^1$ represents a divalent linking group; $C^1$ represents a substituted or non-substituted alkyl group, cycloalkyl group, alkoxy group, alkoxycarbonyl group, acyl group or acyloxy group; j is 0 or 1, p, q and r respectively represent an integer from 0 to 5 and n represents an integer from 1 to 3, provided that a total number of groups represented by $B^1$ and $B^2$ in the formula (1) is from 3 to 10; in case any of p, q and r is equal to or larger than 2, $B^1$, $Q^1$ or $B^2$ present in two or more units may be same or different to each other; and, in case n is equal to or larger than 2, $\{(B^1)_p\text{-}(Q^1)_q\text{—}(B^2)_r\}$ present in two or more units may be same or different to each other.

The smectic liquid crystal composition may be capable of transforming to a smectic A phase.

The dichroic dye may be selected from the group consisting of azo dyes, anthraquinone dyes and phenoxazine dyes.

The dichroic dye may be selected from compounds having at least one group represented by a following formula (2):

$$\text{-}(Het)_j\text{-}\{(B^1)_p\text{-}(Q^1)_q\text{-}(B^2)_r\}_n\text{-}C^1 \qquad \text{Formula (2)}$$

where "Het" represents an oxygen atom or a sulfur atom; $B^1$ and $B^2$ respectively represent a substituted or non-substituted arylene group, heteroarylene group or divalent cycloaliphatic hydrocarbon group; $Q^1$ represents a divalent linking group; $C^1$ represents a substituted or non-substituted, alkyl group, cycloalkyl group, alkoxy group, alkoxycarbonyl group, acyl group or acyloxy group; j is 0 or 1, p, q and r respectively represent an integer from 0 to 5 and n represents an integer from 1 to 3, provided that a total number of groups represented by $B^1$ and $B^2$ in the formula (2) is from 3 to 10; in case any of p, q and r is equal to or larger than 2, $B^1$, $Q^1$ or $B^2$ present in two or more units may be same or different to each other; and, in case n is equal to or larger than 2, $\{(B^1)_p\text{-}(Q^1)_q\text{-}(B^2)_r\}$ present in two or more units may be same or different to each other.

As embodiments of the invention, there are provided the smectic liquid crystal composition, wherein the dichroic dye is a compound represented by a formula (3):

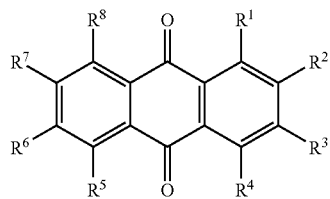

Formula (3)

where $R^1$, $R^2$, $R^3$, $R^4$, $R^5$, $R^6$, $R^7$ and $R^8$ respectively represent a hydrogen atom or a substituent group, provide that at least one is a group represented by -(Het)$_j$-{$(B^1)_p$-$(Q^1)_q$-$(B^2)_r\}_n$-$C^1$, in which "Het" represents an oxygen atom or a sulfur atom, $B^1$ and $B^2$ respectively represent a substituted or non-substituted arylene group, heteroarylene group or divalent cycloaliphatic hydrocarbon group; $Q^1$ represents a divalent linking group; $C^1$ represents a substituted or non-substituted, alkyl group, cycloalkyl group, alkoxy group, alkoxycarbonyl group, acyl group or acyloxy group; j is 0 or 1, p, q and r respectively represent an integer from 0 to 5 and n represents an integer from 1 to 3, provided that a total number of groups represented by $B^1$ and $B^2$ is from 3 to 10; in case any of p, q and r is equal to or larger than 2, $B^1$, $Q^1$ or $B^2$ present in two or more units may be same or different to each other; and, in case n is equal to or larger than 2, $\{(B^1)_p\text{-}(Q^1)_q\text{-}(B^2)_r\}$ present in two or more units may be same or different to each other; and the smectic liquid crystal composition, wherein the dichroic dye is a compound represented by a formula (4):

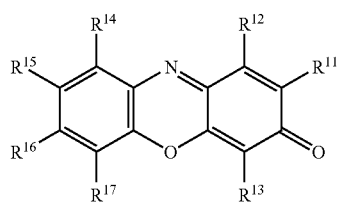

Formula (4)

where $R^{11}$, $R^{12}$, $R^{13}$, $R^{14}$, $R^{15}$, $R^{16}$, and $R^{17}$ respectively represent a hydrogen atom or a substituent group, provided that at least one is a group represented by -(Het)$_j$-{$(B^1)_p$-$(Q^1)_q$-$(B^2)_r\}_n$-$C^1$, in which "Het" represents an oxygen atom or a sulfur atom, $B^1$ and $B^2$ respectively represent a substituted or non-substituted arylene group, heteroarylene group or divalent cycloaliphatic hydrocarbon group; $Q^1$ represents a divalent linking group; $C^1$ represents a substituted or non-substituted alkyl group, cycloalkyl group, alkoxy group, alkoxycarbonyl group, acyl group or acyloxy group; j is 0 or 1, p, q and r respectively represent an integer from 0 to 5, and n represents an integer from 1 to 3, provided that a total number of groups represented by $B^1$ and $B^2$ is from 3 to 10; in case any of p, q and r is equal to or larger than 2, $B^1$, $Q^1$ or $B^2$ present in two or more units may be same or different to each other; and, in case n is equal to or larger than 2, $\{(B^1)_p\text{-}(Q^1)_q\text{-}(B^2)_r\}$ present in two or more units may be same or different to each other.

In another aspect, the present invention provides a liquid crystal device comprising:

a pair of electrodes of which at least one is a transparent electrode, and a layer between the pair of electrodes comprising the smectic liquid crystal composition of the invention.

As embodiments of the invention, there are provide the liquid crystal device, wherein the layer comprises a polymer and the smectic liquid crystal composition dispersed in the polymer; and the liquid crystal device, wherein the layer comprises microcapsules respectively comprising the smectic liquid crystal composition.

According to the present invention, it is possible to provide a liquid crystal device having a high displaying contrast and capable of storing image information, and a smectic liquid crystal composition useful in producing the liquid crystal device.

DETAILED DESCRIPTION OF THE EMBODIMENTS

Embodiments of the present invention are described in detail below. It is to be noted that, in the description, ranges indicated with "to" mean ranges including the numerical values before and after "to" as the minimum and maximum values.

The present invention relates to a smectic liquid crystal composition comprising, at least, a dichroic dye, a dual-frequency switchable nematic liquid crystal and a smectic liquid crystal wherein a dielectric anisotropy of the composition changes from a positive value to a negative value with increasing a frequency of a field applied to the composition; and to a liquid crystal device comprising the smectic liquid crystal composition.

The GH mode liquid crystal device employing a known dual-frequency switchable nematic liquid crystal cannot continue to display images without an electric field, and, therefore suffers from having no memory ability. The inventors conducted various studies, and, as a result, they found that adding smectic liquid crystal is extremely effective for improving bistability and storing image information, and on the basis of the finding, the present invention was achieved.

[Smectic Liquid Crystal Composition]

The smectic liquid crystal of the present invention comprises at least, one dual-frequency nematic liquid crystal, one smectic liquid crystal and one dichroic dye, and the dielectric anisotropy of the composition changes from a positive value to a negative value with increasing a frequency of a field applied to the composition. As well as the nematic liquid crystal, the smectic liquid crystal is preferably selected from dual-frequency switchable liquid crystals. It is possible to provide a liquid crystal device having a high displaying contrast and capable of storing image information by employing such a smectic liquid crystal composition. It is also possible to provide a liquid crystal device without an alignment layer, or, in other words, a liquid crystal device, having a simple construction, and, thus, to contribute to simplifying a process for producing a liquid crystal device. The liquid crystal device not comprising an alignment layer doesn't suffer from light absorption or light reflection due to an alignment layer, and such a liquid crystal device, employing a reflective mode, may have a higher displaying contrast and yield a higher reflectivity.

Various materials which can be used in the invention will be described in detail.

At first, the dual-frequency switchable nematic liquid crystal will be described in detail. The "dual-frequency switchable liquid crystal" means a liquid crystal exhibiting a positive dielectric anisotropy while being in an electric field of a low frequency range and exhibiting an inversion to a negative dielectric anisotropy while being in an electric field of a high frequency range, as detailedly described in *Liquid Crystal Device Handbook*, Japan Society for the Promotion of Science, Committee 142, p. 189-192 (1989), published by Nikkan Kogyo Shimbun). Specific examples of such liquid crystal include those shown in the following, manufactured by Eastman Kodak Co.

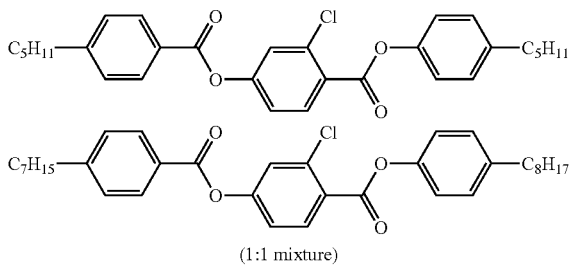

(1:1 mixture)

Also commercially available dual-frequency switchable liquid crystals include DF-02XX, DF-05XX, FX-1001 and FX-1002 manufactured by Chisso Co., and MLC-2048 manufactured by F. Merck Inc.

Next, the smectic liquid crystal which can be used in the invention will be described in detail. The smectic liquid crystal is not to be limited to the specific types, and can be selected from any liquid-crystalline compounds exhibiting a smectic phase, is preferably selected from liquid-crystalline compounds exhibiting a smectic A phase, and is more preferably selected from dual-frequency switchable liquid-crystalline compounds exhibiting a smectic phase A. Among such liquid-crystalline compounds, the compound represented by the following formula (1) is especially preferred.

$$T^1\text{-}\{(D^1)_e\text{-}L^1\}_m\text{-}(D^2)_k\text{-}T^2 \qquad \text{Formula (1)}$$

In the formula (1), $D^1$ and $D^2$ respectively represent a substituted or non-substituted, arylene group, heteroarylene group or divalent cycloaliphatic hydrocarbon group.

The arylene group represented by $D^1$ or $D^2$ is preferably selected from $C_{6-20}$ arylene groups, and more preferably selected from $C_{6-10}$ arylene groups. Preferred is phenylene or naphthalene-diyl, more preferred is substituted phenylene, and much more preferred is 1,4-phenylene.

The heteroarylene group represented by $D^1$ or $D^2$ is preferably selected from $C_{1-20}$ heteroarylene groups, and is more preferably selected from $C_{2-9}$ heteroarylene groups. Preferred examples of the heteroarylene group include heteroarylene residues which are obtained by removing two hydrogen atoms from a pyridine ring, a quinoline ring, an isoquinoline ring, a pyrimidine ring, a pyrazine ring, a thiophene ring, a furan ring, an oxazole ring, a thiazole ring, an imidazole ring, a pyrazole ring, an oxadiazole ring, a thiadiazole ring and heteroaryl rings condensed one kind of rings or two or more kinds of rings selected therefrom.

The divalent cycloaliphatic hydrocarbon group represented by $D^1$ or $D^2$ is preferably selected from $C_{3-20}$ divalent cycloaliphatic hydrocarbon groups, and more preferably selected from $C_{4-10}$ divalent cycloaliphatic hydrocarbon groups. Preferred is cyclohexane-diyl or cyclopentane-diyl, more preferred is cyclohexane-1,2-diyl, cyclohexane-1,3-diyl, cyclohexane-1,4-diyl or cyclopentane-1,3-diyl; and much more preferred is (E)-cyclohexane-1,4-diyl.

The divalent arylene group, heteroarylene group or cycloaliphatic hydrocarbon group represented by $D^1$ or $D^2$ may have one or more substituent groups, and such a substituent group may be selected from Substituent Group V as shown below.

Substituent Group V:

Halogen atom such as chlorine, bromine, iodine or fluorine atom; a mercapto group, a cyano group, a carboxyl group, a phosphoric acid group, a sulfo group, a hydroxy group, a $C_{1-10}$, desirably $C_{2-8}$ and more desirably $C_{2-5}$ carbamoyl group such as methylcarbamoyl, ethylcarbamoyl or morpholinocarbamoyl; a $C_{0-10}$, desirably $C_{2-8}$ and more desirably $C_{2-5}$ sulfamoyl group such as methylsulfamoyl, ethylsulfamoyl or piperidinosulfamoyl; a nitro group; a $C_{1-20}$, desirably $C_{1-10}$ and more desirably $C_{1-8}$ alkoxy group such as methoxy, ethoxy, 2-methoxyethoxy or 2-phenylethoxy; a $C_{6-20}$, desirably $C_{6-12}$ and more desirably $C_{6-10}$ aryloxy group such as phenoxy, p-methylphenoxy, p-chlorophenoxy or naphthoxy; a $C_{1-20}$, desirably $C_{2-12}$ and more desirably $C_{2-8}$ acyl group such as acetyl, benzoyl or trichloroacetyl; a $C_{1-20}$, desirably $C_{2-12}$ and more desirably $C_{2-8}$ acyloxy group such as acetyloxy or benzoyloxy; a $C_{1-20}$, desirably $C_{2-12}$ and more desirably $C_{2-8}$ acylamino group such as acetylamino; a $C_{1-20}$, desirably $C_{1-10}$ and more desirably $C_{1-8}$ sulfonyl group such as methanesulfonyl, ethanesulfonyl or benzenesulfonyl; a $C_{1-20}$, desirably $C_{1-10}$ and more desirably $C_{1-8}$ sulfinyl group such as methanesulfinyl, ethanesulfinyl or benzenesulfinyl; a $C_{1-20}$, desirably $C_{1-12}$ and more desirably $C_{1-8}$ substituted or non-substituted amino group such as non-substituted amino, methylamino, dimethylamino, benzylamino, anilino, diphenylamino, 4-methylphenylamino, 4-ethylphenylamino, 3-n-propylphenylamino, 4-n-propyl phenylamino, 3-n-butylphenylamino, 4-n-butylphenylamino, 3-n-pentylphenylamino, 4-n-pentylphenylamino, 3-trifluoro methylphenylamino, 4-trifluoromethylphenylamino, 2-pyridylamino, 3-pyridylamino, 2-thiazolylamino, 2-oxazolylamino, N,N-methylphenylamino, N,N-ethyl phenylamino; a $C_{0-15}$, desirably $C_{3-10}$ and more desirably $C_{3-6}$ ammonium group such as trimethylammonium or triethylammonium; a $C_{0-15}$, desirably $C_{1-10}$ and more desirably $C_{1-6}$ hydrazino group such as trimethylhydrazino; a $C_{1-15}$, desirably $C_{1-10}$ and more desirably $C_{1-6}$ ureido group such as non-substituted ureido or N,N-dimethylureido; a $C_{1-15}$, desirably $C_{1-10}$ and more desirably $C_{1-6}$ imide group such as succinimide; a $C_{1-20}$, desirably $C_{1-12}$ and more desirably $C_{1-8}$ alkylthio group such as methylthio, ethylthio or propylthio; a $C_{6-80}$, desirably $C_{6-40}$ and more desirably $C_{6-30}$ arylthio group such as phenylthio, p-methylphenylthio, p-chlorophenylthio, 2-pyridylthio, 1-naphthylthio, 2-naphthylthio, 4-propylcyclohexyl-4'-diphenylthio, 4-butylcyclohexyl-4'-diphenylthio, 4-pentylcyclohexyl-4'-diphenylthio or 4-propylphenyl-2- ethynyl-4'-diphenylthio; a $C_{1-80}$, desirably $C_{1-40}$ and more desirably $C_{1-30}$ heteroarylthio group such as 2-pyridylthio, 3-pyridylthio, 4-pyridylthio, 2-quinolylthio, 2-frylthio, 2-pyrrolylthio; a $C_{2-20}$, desirably $C_{2-12}$ and more desirably $C_{2-8}$ alkoxycarbonyl group such as methoxycarbonyl, ethoxycarbonyl or 2-benzyloxycarbonyl; a $C_{6-20}$, desirably $C_{6-12}$ and more desirably $C_{6-10}$ aryloxycarbonyl group such as phenoxycarbonyl; a $C_{1-18}$, desirably $C_{1-10}$ and more desirably $C_{1-15}$ non-substituted alkyl group such as methyl, ethyl, propyl or butyl; a $C_{1-18}$, desirably $C_{1-10}$ and more desirably $C_{1-5}$ substituted alkyl group such as hydroxylmethyl, trifluoromethyl, benzyl, carboxyethyl, ethoxycarbonylmethyl or acetylamino methyl, of which examples also include a $C_{2-18}$ (desirably $C_{3-10}$ and more desirably $C_{3-5}$) unsaturated hydrocarbon group such as vinyl, ethynyl, 1-cyclohexenel, benzylidine or benzylidene; a $C_{6-20}$, desirably $C_{6-15}$ and more desirably $C_{6-10}$ substituted or non-substituted aryl group such as phenyl, naphthyl, p-carboxyphenyl, p-nitrophenyl 3,5-dichlorophenyl, p-cyanophenyl, m-fluorophenyl, p-tolyl, 4-propylcyclohexyl-4'-diphenyl, 4-butylcyclohexyl-4'-diphenyl, 4-pentylcyclohexyl-4'-diphenyl or 4-propylphenyl-2-ethynyl-4'-diphenyl; and a $C_{1-20}$, desirably $C_{2-10}$ and more desirably $C_{4-6}$ substituted or non-substituted heteroaryl group such as pyridyl, 5-methylpyridyl, thienyl, furyl, morpholino or tetrahydrofurfuryl.

The rings such as benzene or naphthalene ring included in the substituents exemplified above may be condensed with other rings. Examples of the substituent also include groups substituted with the substituent selected from Substituent Group V.

Among these, as a substituent group of $D^1$ or $D^2$, the exemplified alkyl group, alkoxy group, halogen atom, hydroxy and cyano are preferred, and the exemplified alkyl group, halogen atom or cyano are more preferred.

$L^1$ represents a divalent linking group. $L^1$ preferably represents an alkenylene, an alkynylene, an ether (—O—), an ester (—C(=O)O— or —OC(=O)—), a carbonyl, an azo, an azoxy or an alkyleneoxy; more preferably represents an ester or an alkyleneoxy.

The alkenylene represented by $L^1$ is preferably selected from $C_{2-20}$ alkenylene groups, and more preferably selected from $C_{2-10}$ alkenylene groups. Specific examples of the alkenylene include an ethenylene.

The alkynylene represented by $L^1$ is preferably selected from $C_{2-20}$ alkynylene groups, and more preferably selected from $C_{2-10}$ alkynylene groups. Specific examples of the alkynylene include an ethynylene.

$T^1$ and $T^2$ respectively represent an alkyl group, an alkoxy group, an alkoxycarbonyl group, an acyl group, an acyloxy group, a halogen atom or a cyano.

$T^1$ and $T^2$ preferably represent a $C_{1-20}$, more preferably a $C_{4-20}$, and much more preferably a $C_{6-18}$ alkyl group; a $C_{1-30}$, more preferably $C_{4-20}$, and much more preferably $C_{6-18}$ alkoxy group; a $C_{2-30}$, more preferably a $C_{5-21}$, and much more preferably $C_{7-19}$ alkoxycarbonyl group; a $C_{2-30}$, more preferably a $C_{5-21}$, and much more preferably $C_{7-19}$ acyl group; a $C_{2-30}$, more preferably a $C_{5-21}$, and much more preferably $C_{7-19}$ acyloxy group; a halogen atom or cyano.

The alkyl group, alkoxy group, alkoxycarbonyl group, acyl group or acyloxy group may have one or more substituents, and such a substituent group can be selected from Substituent Group V shown above.

Among Substituent Group V, as substituent of $T^1$ or $T^2$, a halogen atom (especially chlorine atom or a fluorine atom), cyano, hydroxyl, alkoxy or acyl are preferred.

Examples of the alkyl group represented by $T^1$ or $T^2$ include octyl, nonyl, decyl, undecyl, dodecyl, octadecyl, 4-cyanobutyl, trifluoromethyl and 3-methoxy propyl.

Examples of the alkoxy group represented by $T^1$ or $T^2$ include octyloxy, undecyloxy, dodecyloxy, trifluoromethoxy and 2-methoxy ethoxy.

Examples of the alkoxycarbonyl group represented by $T^1$ or $T^2$ include octyloxycarbonyl and dodecyloxycarbonyl.

Examples of the acyl group represented by $T^1$ or $T^2$ include octylcarbonyl and dodecylcarbonyl.

Examples of the acyloxy group represented by $T^1$ or $T^2$ include octylcarbonyloxy and dodecylcarbonyloxy.

$T^1$ and $T^2$ more preferably represent an alkyl group, an alkoxy group, a halogen atom or a cyano.

In the formula, "e" represents an integer from 1 to 3, and preferably represents 1 or 2.

In the formula, "m" represents an integer from 1 to 3, and preferably represents 1 or 2.

In the formula, "k" represents 1 or 2.

The sum number of the groups represented by $D^1$ and $D^2$, or, in other words, "e×m+k" is 3 to 5, and is preferably 3 or 4. When "e" or "k" is 2 or more, plural $D^1$ or $D^2$ are same or different to each other; and when "m" is 2 or more, plural $\{(D^1)_e\text{-}L^1\}$ are same or different to each other.

Preferred combinations of "e", "m" and "k" are shown below.
(i) e=1, m=2 and k=1;
(ii) e=2, m=1 and k=1;
(iii) e=2, m=1 and k=2.

Examples of the smectic liquid crystal, which can be used in the invention, include, but not to be limited to, those shown below.

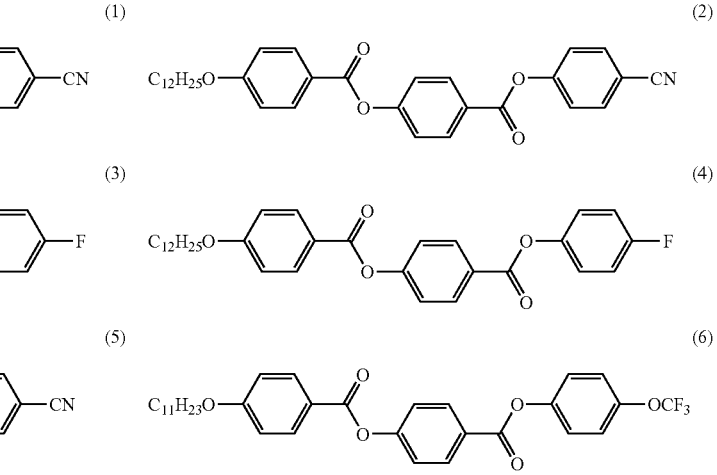

-continued

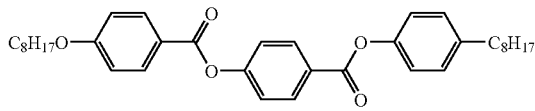
(7)

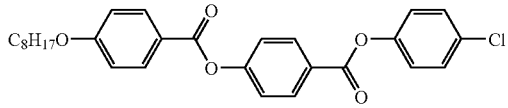
(8)

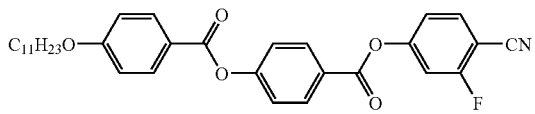
(9)

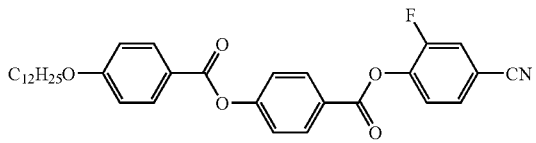
(10)

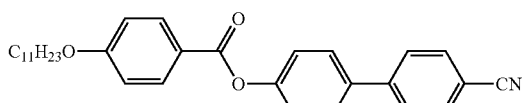
(11)

(12)

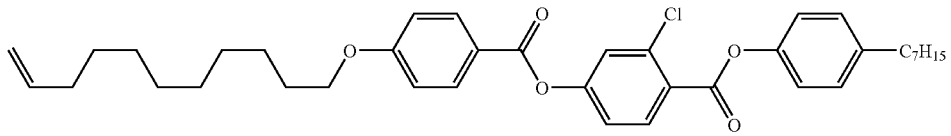
(13)

The smectic liquid crystal composition of the invention may comprise one or more types of nematic liquid crystal that does not show an inversion of the sign of the dielectric anisotropy between a low frequency region and a high frequency region of the applied electric field. Specific examples of such the nematic liquid crystal which can be used in the invention include an azomethine compound, a cyanobiphenyl compound, a cyanophenyl ester, a fluorine-substituted phenyl ester, a cyclohexanecarboxylate phenyl ester, a fluorine-substituted cyclohexanecarboxylate phenyl ester, cyanophenylcyclohexane, a fluorine-substituted phenylcyclohexane, a cyano-substituted phenylpyrimidine, a fluorine-substituted phenylpyrimidine, an alkoxy-substituted phenylpyrimidine, a fluorine-substituted, alkoxy-substituted phenylpyrimidine, phenyldioxane, a tolan compound, a fluorine-substituted tolan compound, and alkenylcyclohexyl benzonitrile. Also there can be employed liquid crystal compounds described in *Liquid Crystal Device Handbook,* Japan Society for the Promotion of Science, Committee 142, p. 154-192 and 715-722 (1989), Published by Nikkan Kogyo Shimbun). There can also be employed a fluorine-substituted host liquid crystal suitable for a TFT drive, such as liquid crystals manufactured by E. Merck Inc. (such as ZLI-4692, MLC-6267, 6284, 6287, 6288, 6406, 6422, 6423, 6425, 6435, 6437, 7700, 7800, 9000, 9100, 9200, 9300 or 10000) or liquid crystals manufactured by Chisso Co. (such as LIXON 5036xx, 5037xx, 5039xx, 5040xx or 5041xx).

To the smectic liquid crystal composition of the invention, there may be added a compound not showing a liquid-crystalline property for the purpose of changing physical properties of the host liquid crystal (such as a temperature range of the liquid crystal phase, a dielectric anisotropy, a refractive index anisotropy or a cross-over frequency). The term "cross-over frequency" means, in dual-frequency switchable liquid crystal, a frequency at which the dielectric anisotropy changes from positive to negative. The liquid crystal composition of the invention may further contain one or more additives such as a chiral agent, an ultraviolet absorber or an antioxidant. Examples of such an additive include chiral agents for TN or STN mode, described in *Liquid Crystal Device Handbook,* Japan Society for the Promotion of Science, Committee 142, p. 199-202 (1989), Published by Nikkan Kogyo Shimbun).

The molar ratio of the dual-frequency switchable nematic liquid crystal to the smectic liquid crystal is not to be limited to a specific range, and preferably falls within the range from 20 mol %/80 mol % to 99 mol %/1 mol %, more preferably falls within the range from 50 mol %/50 mol % to 95 mol %/5 mol %, and much more preferably falls within the range from 70 mol %/30 mol % to 90 mol %/10 mol %.

Next, the dichroic dye which can be used in the invention will be described in detail.

Dichroic dye is defined as a compound to be dissolved in host liquid crystal and to show a function of absorbing light. The dichroic dye used in the present invention may have any absorption maximum and an absorption band, but preferably has an absorption maximum in a yellow region (Y), a magenta region (M) or a cyan region (C). Also the dichroic dye may be employed singly or in a mixture of plural types. In case of mixing plural dyes, a mixture of dichroic dyes having an absorption maximum in Y, M or C is preferably employed. Known dichroic dyes are, for example, described by A. V. Ivashchenko, "Diachronic Dyes for Liquid Crystal Display", CRC (1994). Also a method of obtaining a full-color display by mixing a yellow dye, a magenta dye and a cyan dye is described in detail in "Color Chemistry", Sumio Tokita, Maruzen (1982). The yellow region, magenta region and cyan region mentioned above respectively mean a region of 430 to 490 nm, a region of 500 to 580 nm and a region of 600 to 700 nm.

The dichroic dye may be selected from compounds having any chromophoric group. Examples of the chromophoric group include azo dye residues, anthraquinone dye residues, perylene dye residues, merocyanine dye residues, azomethyne dye residues, phthaloperylene dye residues, indigo dye residues, azulene dye residues, dioxazine dye residues, polythiophene dye residues and phenoxazine dye residues. Among these, azo dye residues, anthraquinone dye residues and phenoxazine dye residues are preferred, and anthraquinone dye residues and phenoxazine dye, such as phenoxazine-3-one, residues are more preferred.

Examples of the azo dye include monoazo, diazo, trisazo, tetrakisazo and pentakisazo dyes. Among these, monoazo, bisazo or trisazo dyes are preferred.

The azo dye may contain any ring such as an aromatic ring (for example, benzene ring or naphthalene ring) and a hetero ring (for example, quinoline ring, pyridine ring, thiazole ring, benzothiazole ring, oxazole ring, benzoxazole ring, imidazole ring, bennzoimidazole ring or pyrimidine ring).

The anthraquinone dye desirably has at least one substituent containing an oxygen atom, a sulfur atom or a nitrogen atom, such as an alkoxy group, an aryloxy group, an alkylthio group, an arylthio group, an alkylamino group or an arylamino group. The number of the substituents included in the anthraquinone dye is not limited to any range, and, in general, disubstituted, trisubstituted or tetrakissubstituted anthraquinone dyes are preferred, and disubstituted or trisubstituted anthraquinone dyes are more preferred. The substituents may bond to any position of anthraquinone rings, and, in general, 1,4-disubstituted, 1,5-disubstituted, 1,4,5-trisubstituted, 1,2,4-trisubstituted, 1,2,5-trisubstituted, 1,2,4,5-tetrasubstituted and 1,2,5,6-tetrasubstituted anthraquinone dyes are preferred.

The dichroic dye, which can be used in the invention, preferably has at least one group (substituent) represented by a formula (2).

-(Het)$_j$-{(B$^1$)$_p$-(Q$^1$)$_q$-(B$^2$)$_r$}$_n$-C$^1$　　　　　Formula (2)

In the formula (2), "Het" represents an oxygen atom or a sulfur atom, and preferably a sulfur atom.

In the formula (2), B$^1$ and B$^2$ respectively represent a substituted or non-substituted, arylene group, heteroarylene group or divalent cycloaliphatic hydrocarbon group.

The arylene group represented by B$^1$ or B$^2$ is desirably selected from C$_{6-20}$ arylene groups, and is more desirably selected from C$_{6-10}$ arylene groups. Preferred examples of the arylene group include the divalent residue of substituted or non-substituted, benzene, naphthalene and anthracene. Divalent residues of benzene or substituted benzene are more preferred and 1,4-phenylene is especially preferred.

The heteroarylene group represented by B$^1$ or B$^2$ is desirably selected from C$_{1-20}$ heteroarylene groups, and is more desirable selected from C$_{2-9}$ heteroarylene groups. Preferred examples of the heteroarylene group include divalent residues which can be obtained by removing two hydrogen atoms from pyridine, quinoline, isoquinoline, pyrimidine, pyrazine, thiophene, furan, oxazole, thiazole, imidazole, pyrazole, oxadiazole, thiadiazole, triazole and heteroaryl rings condensed one kind of rings or two or more kinds of rings selected therefrom.

The divalent cycloaliphatic hydrocarbon group represented by B$^1$ or B$^2$ is desirably selected from C$_{3-20}$ divalent cycloaliphatic hydrocarbon groups, and is much more desirably from C$_{4-20}$ divalent cycloaliphatic hydrocarbon groups. Preferred examples of the divalent cycloaliphatic hydrocarbon group are cyclohexane-diyl and cyclopentane-diyl; more preferred examples are cyclohexane-1,2-diyl, cyclohexane-1,3-diyl, cyclohexane-1,4-diyl and cyclopentane-1,3-diyl; and the most preferred example is (E)-cyclohexane-1,4-diyl.

The arylene group, heteroarylene group or divalent cycloaliphatic hydrocarbon represented by B$^1$ or B$^2$ may have one or more substituents, and such a substituent group is desirably selected from Substituent Group V described above. Among those, the exemplified alkyl group, aryl group, alkoxy group, aryloxy group, halogen atom, amino, substituted amino group, hydroxyl, alkylthio group and arylthio group are preferred, and the exemplified alkyl group, aryl group and halogen atom are more preferred.

In the formula (2), Q$^1$ represents a divalent linking group. Q$^1$ may consist of at least one atom selected from carbon atom, nitrogen atom, oxygen atom or sulfur atom.

The linking group represented by Q$^1$ preferably represents a C$_{0-60}$ divalent linking group, more preferably represents a C$_{0-30}$ divalent linking group, and much more preferably represents a C$_{0-20}$ divalent linking group. Preferred examples of the liking group represented by Q$^1$ include linking groups consisting of one or a combination of two or more selected from the group consisting of an alkylene group, an alkenylene group, an alkynylene group, an amide group (—NH—), an ether group (—O—), an ester group (—COO— or —OCO—), a sulfonamide group (—SO$_2$NH—), a ureido group (—NH—CO—NH—), a sulfonyl group (—SO$_2$—), a sulfinyl group (—SO—), a thioether group (—s—), a carbonyl group (—CO—), —NR— (where R is a hydrogen atom, an alkyl group or an aryl group), an azo group (—N$_2$—), an azoxy group (—N$_2$(O)—) and a divalent heterocyclic group.

The alkylene group represented by Q$^1$ is preferably selected from C$_{1-20}$ alkylene groups, and is more preferably selected from C$_{1-10}$ alkylene groups. Specific examples of the alkylene group include methylene, ethylene, propylene, butylene, pentylene and cyclohexyl-1,4-diyl.

The alkenylene group represented by Q$^1$ is preferably selected from C$_{2-20}$ alkenylene groups, and is more preferably selected from C$_{2-10}$ alkenylene groups. Specific examples of the alkenylene group include ethenylene.

The alkynylene group represented by Q$^1$ is preferably selected from C$_{2-20}$ alkynylene groups, and is more preferably selected from C$_{2-10}$ alkynylene groups. Specific examples of the alkynylene group include ethynylene.

The alkyl group represented by R in —NR— is preferably selected from C$_{1-20}$ alkyl groups, and is more preferably selected from C$_{1-10}$ alkyl groups. The aryl group represented by R in —NR— is preferably selected from C$_{6-14}$ aryl groups, and is more preferably selected from C$_{6-10}$ aryl groups.

The divalent heterocyclic group represented by Q$^1$ is preferably selected from C$_{2-20}$ divalent heterocyclic groups, and is much more preferably selected from C$_{4-10}$ divalent heterocyclic groups. Specific examples of the divalent heterocyclic group include piperazine-1,4-diyl.

Q$^1$ is desirably an alkylene group, an alkenylene group, an alkynylene group, an ether group, a thioether group, an amide group, an ester group, a carbonyl group or a combination thereof. And Q$^1$ is more desirably an alkylene group, alkynylene group, an ether group, an amide group, an ester group or a carbonyl group.

Q$^1$ may carry a substituent group selected from Substituent Group V described above.

In the formula (2), C$^1$ represents a substituted or non-substituted, alkyl group, cycloalkyl group, alkoxy group, alkoxycarbonyl group, acyl group or acyloxy group.

$C^1$ preferably represents a $C_{1-30}$, more preferably $C_{1-12}$ and much more preferably $C_{1-8}$ alkyl and cycloalkyl group; a $C_{1-20}$, more preferably $C_{1-10}$ and much more preferably $C_{1-8}$ alkoxy group; a $C_{1-20}$, more preferably $C_{2-12}$ and much more preferably $C_{2-8}$ acyloxy group; a $C_{1-30}$, more preferably $C_{1-12}$ and much more preferably $C_{1-8}$ acyl group; or a $C_{2-20}$, more preferably $C_{2-12}$ and much more preferably $C_{2-8}$ alkoxycarbonyl group.

Specific examples of the alkyl group and cycloalkyl group represented by $C^1$ include methyl, ethyl, propyl, butyl, t-butyl, i-butyl, s-butyl, pentyl, t-pentyl, hexyl, heptyl, octyl, cyclohexyl, 4-methylcyclohexyl, 4-ethylcyclohexyl, 4-propylcyclohexyl, 4-butylcyclohexyl, 4-pentylcyclohexyl, hydroxymethyl, trifluoromethyl and benzyl.

Specific examples of the alkoxy group include methoxy, ethoxy, 2-methoxy ethoxy and 2-phenylethoxy.

Specific examples of the acyloxy group include acetyloxy and benzoyloxy.

Specific examples of the acyl group include formyl, acetyl pivaloyl, 2-chloroacetyl, stearoyl, benzoyl and p-n-octyloxyphenylcarbonyl.

Specific examples of the alkoxycarbonyl group include methoxycarbonyl, ethoxycarbonyl and 2-benzyloxycarbonyl.

$C^1$ is desirably selected from a substituted or non-substituted alkyl group or a substituted or non-substituted alkoxy group, and more desirably selected from ethyl, propyl, butyl, pentyl, hexyl, or trifluoromethoxy.

$C^1$ may carry one or more substituents selected from Substituent Group V described above.

The alkyl group represented by $C^1$ may carry one or more substituents selected from Substituent Group V described above, and preferred examples of the substituent of the alkyl group include the exemplified halogen atom, cyano, hydroxy, carbamoyl, alkoxy, aryloxy, acyl, acyloxy, acylamino, amino, alkylthio, arylthio, heteroarylthio, alkoxycarbonyl and aryloxycarbonyl.

The cycloalkyl group represented by $C^1$ may carry one or more substituents selected from Substituent Group V described above, and preferred examples of the substituent of the cycloalkyl group include the exemplified halogen atom, cyano, hydroxy, carbamoyl, alkoxy, aryloxy, acyl acyloxy, acylamino, amino, alkylthio, arylthio, heteroarylthio, alkoxycarbonyl, aryloxycarbonyl and alkyl.

The alkoxy group represented by $C^1$ may carry one or more substituents selected from Substituent Group V described above, and preferred examples of the substituent of the alkoxy group include the exemplified halogen atom (especially fluorine atom), cyano, hydroxy, carbamoyl, alkoxy, aryloxy, acyl acyloxy, acylamino, amino, alkylthio, arylthio, heteroarylthio, alkoxycarbonyl and aryloxycarbonyl.

The alkoxycarbonyl group represented by $C^1$ may carry one or more substituents selected from Substituent Group V described above, and preferred examples of the substituent of the alkoxycarbonyl group include the exemplified halogen atom, cyano, hydroxy, carbamoyl, alkoxy, aryloxy, acyl, acyloxy, acylamino, amino, alkylthio, arylthio, heteroarylthio, alkoxycarbonyl and aryloxycarbonyl.

The acyl group represented by $C^1$ may carry one or more substituents selected from Substituent Group V described above, and preferred examples of the substituent of the acyl group include the exemplified halogen atom, cyano, hydroxy, carbamoyl, alkoxy, aryloxy, acyl, acyloxy, acylamino, amino, alkylthio, arylthio, heteroarylthio, alkoxycarbonyl and aryloxycarbonyl.

The acyloxy group represented by $C^1$ may carry one or more substituents selected from Substituent Group V described above, and preferred examples of the substituent of the acyloxy group include the exemplified halogen atom, cyano, hydroxy, carbamoyl, alkoxy, aryloxy, acyl, acyloxy, acylamino, amino, alkylthio, arylthio, heteroarylthio, alkoxycarbonyl and aryloxycarbonyl.

In the formula (2), j represents 0 or 1, and is preferably 0.

In the formula (2), p, q and r respectively represent an integer from 0 to 5; and n represents an integer from 1 to 3, provided that a total number of groups represented by $B^1$ and $B^2$ is from 3 to 10, and is preferably from 3 to 5.

In case any of p, q and r is equal to or larger than 2, $B^1$, $Q^1$ or $B^2$ present in two or more units may be same or different to each other; and, in case n is equal to or larger than 2, $\{(B^1)_p\text{-}(Q^1)_q\text{-}(B^2)_r\}$ present in two or more units may be same or different to each other.

Preferred combinations of p, q and r are shown below:
(i) P=3, q=0, r=0 and n=1;
(ii) P=4, q=0, r=0 and n=1;
(iii) P=5, q=0, r=0 and n=1;
(iv) P=2, q=0, r=1 and n=1;
(v) P=2, q=1, r=1 and n=1;
(vi) P=1, q=1, r=2 and n=1;
(vii) P=3, q=1, r=1 and n=1;
(viii) P=2, q=0, r=2 and n=1;
(ix) P=1, q=1, r=1 and n=2;
(x) P=2, q=1, r=1 and n=2;

Especially preferred combinations are (i) P=3, q=0, r=0 and n=1; (iv) P=2, q=0, r=1 and n=1; and (v) P=2, q=1, r=1 and n=1.

The group (substituent) represented by the formula of $-\{(B)^p\text{-}(Q^1)_q\text{-}(B^2)_r\}_n\text{-}C^1$ preferably containing structures exhibiting liquid crystallinity. The structures may exhibit any kind of liquid crystallinity, however, preferably nematic, smectic, or discotic liquid crystallinity, more preferably nematic or smectic liquid crystallinity.

Specific examples of the group (substituent) represented by the formula of $-\{(B^1)_p\text{-}(Q^1)_q\text{-}(B^2)_r\}_n\text{-}C^1$ will be listed below, which by no means restricts the present invention. In the following formulae, wave lines denote portions of bonding to Het.

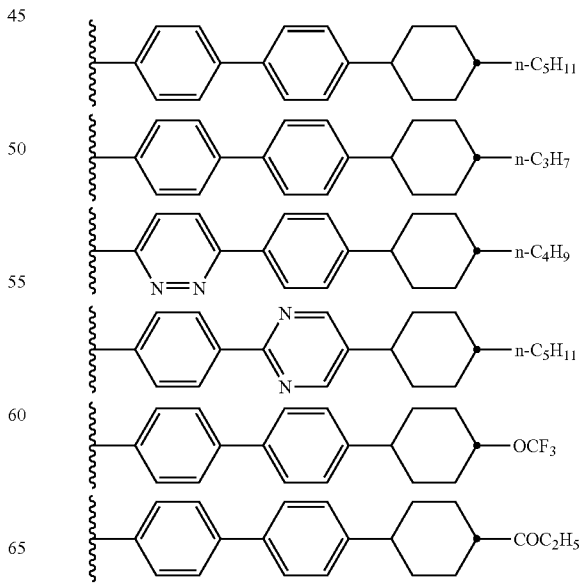

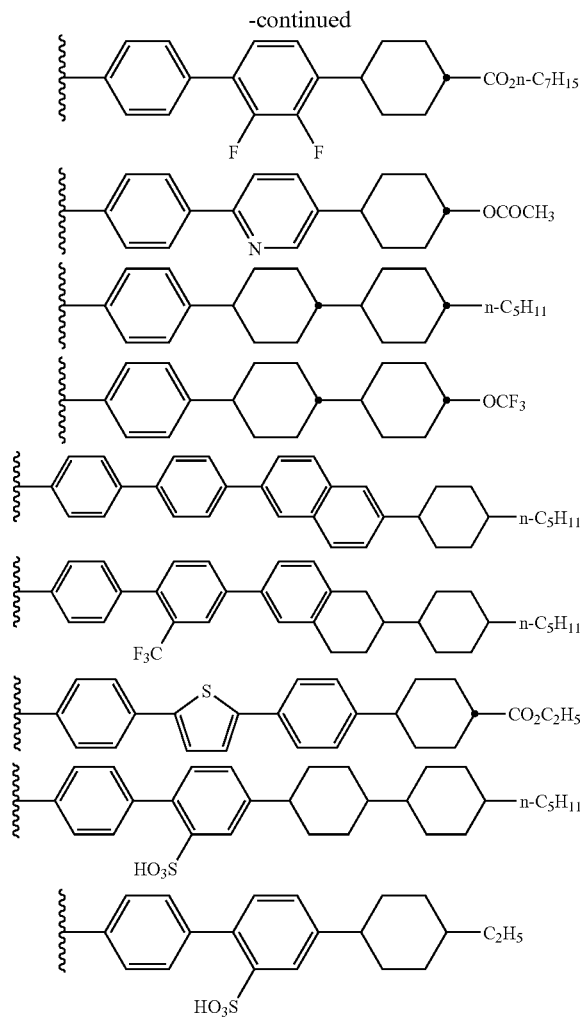

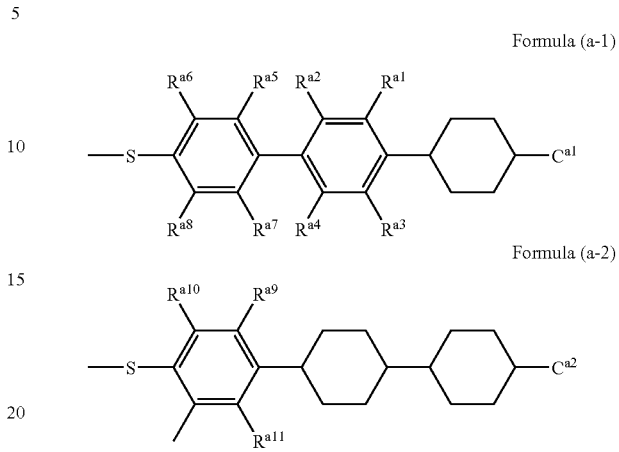

The dichroic dye to be used in the present invention desirably has at least one, more desirably 1 to 8, much more desirably 1 to 4 and further much more desirably 1 or 2 substituents represented by the formula "-(Het)$_j$-{(B$^1$)$_p$-(Q$^1$)$_q$-(B$^2$)$_r$}$_n$-C$^1$".

Preferred examples of the group represented by the formula (2) are as follows:

[1] "Het" is a sulfur atom, B$^1$ is a substituted or non-substituted arylene or heteroarylene group, B$^2$ is a cyclohexane-1,4-diyl group, C$^1$ is a substituted or non-substituted alkyl group, j=1, p=2, q=0, r=1 and n=1; and

[2] "Het" is a sulfur atom, B$^1$ is a substituted or non-substituted arylene or heteroarylene group, B$^2$ is a cyclohexane-1,4-diyl group, C$^1$ is a substituted or non-substituted alkyl group, j=1, p=1, q=0, r=2 and n=1.

More preferred examples of the group represented by the formula (2) are as follows:

[3] "Het" is a sulfur atom, B$^1$ is a substituted or non-substituted 1,4-phenylene group, B$^2$ is a trans-cyclohexyl group, C$^1$ is a substituted or non-substituted alkyl group (preferably methyl, ethyl, propyl, butyl, pentyl or hexyl), j=1, p=2, q=0, r=1 and n=1, or, in other words, a group represented by a formula (a-1) shown below; and

[4] "Het" is a sulfur atom, B$^1$ is a substituted or non-substituted 1,4-phenylene group, B$^2$ is a trans-cyclohexane-1,4-diyl group, C$^1$ is a substituted or non-substituted alkyl group (preferably methyl, ethyl, propyl, butyl, pentyl or hexyl), j=1, p=1, q=0, r=2 and n=1, or, in other words, a group presented by a formula (a-2) shown below.

In the formulae, R$^{a1}$ to R$^{a12}$ respectively represent a hydrogen atom or a substituent group. The substituent is selected from Substituent Group V described above. It is preferred that R$^{a1}$ to R$^{a12}$ respectively represent a hydrogen atom, a halogen atom (preferably fluorine atom), a substituted or non-substituted alkyl group, a substituted or non-substituted aryl group or a substituted or non-substituted alkoxy group.

The preferred alkyl group, aryl group or alkoxy group respectively represented by R$^{a1}$ to R$^{a12}$ are same as those exemplified in Substituted Group V.

In the formulae, C$^{a1}$ and C$^{a2}$ respectively represent a substituted or non-substituted alkyl group, preferably a substituted or non-substituted C$_{1-20}$ alkyl group, much more preferably a substituted or non-substituted C$_{1-10}$ alkyl group, especially preferably methyl, ethyl, propyl, butyl, pentyl or hexyl.

The dichroic dye may be selected from azo dyes. Examples of the azo dye include monoazo, diazo, trisazo, tetrakisazo and pentakisazo dyes. Among these, monoazo, bisazo or trisazo dyes are preferred.

Any azo dyes, containing any ring such as an aromatic ring (e.g. benzene ring and naphthalene ring) and a hetero ring (e.g. quinoline ring, pyridine ring, thiazole ring, benzothiazole ring, oxazole ring, benzoxazole ring, imidazole ring, benzoimidazole ring and pyrimidine ring), can be used in the invention. Among these, azo dyes carrying the group represented by the formula (2) are preferred.

The dichroic dye may be selected from anthraquinone dyes. Anthraquinone dyes carrying one or more groups containing an oxygen atom, a nitrogen atom or a sulfur atom are preferred, and the anthraquinone dyes carrying an alkoxy group, an aryloxy group, an alkylthio group, an arylthio group, an alkylamino group, arylamino group or the like are more preferred. The number of the substituents included in the anthraquinone dye is not limited to any range, and, in general, disubstituted, trisubstituted or tetrakissubstituted anthraquinone dyes are preferred, and disubstituted or trisubstituted anthraquinone dyes are more preferred. The substituents may bond to any position of anthraquinone rings, and, in general, 1,4-disubstituted, 1,5-disubstituted, 1,4,5-trisubstituted, 1,2,4-trisubstituted, 1,2,5-trisubstituted, 1,2,4,5-tetrasubstituted and 1,2,5,6-tetrasubstituted anthraquinone dyes are preferred. Among these, anthraquinone dyes carrying the group represented by the formula (2) are preferred.

The dichroic dye which can be used in the invention desirably selected from anthraquinone dyes represented by a formula (3) shown below.

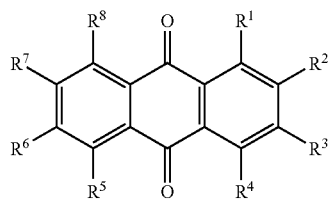

Formula (3)

group, an arylthio group, an alkylamino group, arylamino group or the like are more preferred; and the phenoxazine dyes carrying one or more groups represented by the formula (2) are much more preferred.

The phenoxazine dye represented by the formula (4) is much more preferred.

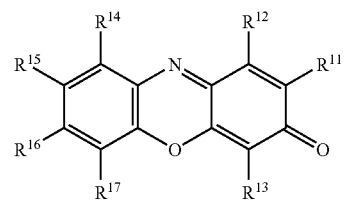

Formula (4)

In the formula (3), at least one of $R^1$, $R^2$, $R^3$, $R^4$, $R^5$, $R^6$, $R^7$ and $R^8$ is a group (substituent) represented by -(Het)$_j$-{(B$^1$)$_p$-(Q$^1$)$_q$-(B$^2$)$_r$}$_n$-C$^1$, and others represent a hydrogen atom or a substituent group.

In the group of -(Het)$_j$-{(B$^1$)$_p$-(Q$^1$)$_q$-(B$^2$)$_r$}$_n$-C$^1$, "Het" represents an oxygen atom or a sulfur atom; $B^1$ and $B^2$ respectively represent a substituted or non-substituted, arylene group, heteroarylene group or divalent cycloaliphatic hydrocarbon group; $Q^1$ represents a divalent linking group; $C^1$ represents a substituted or non-substituted, alkyl group, cycloalkyl group, alkoxy group, alkoxycarbonyl group, acyl group or acyloxy group; j is 0 or 1, p, q and r respectively represent an integer from 0 to 5, and n represents an integer from 1 to 3, provided that a total number of groups represented by $B^1$ and $B^2$ is from 3 to 10; in case any of p, q and r is equal to or larger than 2, $B^1$, $Q^1$ or $B^2$ present in two or more units may be same or different to each other; and, in case n is equal to or larger than 2, {(B$^1$)$_p$-(Q$^1$)$_q$-(B$^2$)$_r$} present in two or more units may be same or different to each other.

In the formula (3), "Het", $B^1$, $B^2$, $Q^1$, $C^1$, j, p, q, r and n have same preferred ranges as in the formula (2).

The substituent represented by $R^1$, $R^2$, $R^3$, $R^4$, $R^5$, $R^6$, $R^7$ or $R^8$ may be selected from Substituent Group V, and is preferably selected from the group consisting of the exemplified halogen atom, mercapto, hydroxy, carbamoyl, sulfamoyl, nitro, alkoxy, aryloxy, acyloxy, acylamino, amino, alkylthio, arylthio, heteroarylthio, alkoxycarbonyl, aryloxycarbonyl, alkyl, aryl and heteroaryl; and is more preferably selected from the group consisting of the exemplified halogen atom, hydroxy, nitro, alkoxy, aryloxy, acyloxy, amino, alkylthio, arylthio, heteroarylthio, alkoxycarbonyl, aryloxycarbonyl, alkyl, aryl and heteroaryl.

One preferred example is a compound of the formula (3) in which at least one of $R^1$, $R^4$, $R^5$ and $R^8$ is the group represented by -(Het)$_j$-{(B$^1$)$_p$-(Q$^1$)$_q$-(B$^2$)$_r$}$_n$-C$^1$.

The dichroic dye may be selected from phenoxazine dyes. The phenoxazine (phenoxazine-3-one) dyes carrying one or more groups containing an oxygen atom, a sulfur atom or a nitrogen atom are preferred, and the phenoxazine dyes carrying an alkoxy group, an aryloxy group, an alkylthio In the formula, at least one of $R^{11}$, $R^{12}$, $R^{13}$, $R^{14}$, $R^{15}$, $R^{16}$, and $R^{17}$ represents a group (substituent) represented by -(Het)$_j$-{(B$^1$)$_p$-(Q$^1$)$_q$-(B$^2$)$_r$}$_n$-C$^1$, and others represent a hydrogen atom or a substituent group.

In the group of -(Het)$_j$-{(B$^1$)$_p$-(Q$^1$)$_q$-(B$^2$)$_r$}$_n$-C$^1$, "Het" represents an oxygen atom or a sulfur atom; $B^1$ and $B^2$ respectively represent a substituted or non-substituted, arylene group, heteroarylene group or divalent cycloaliphatic hydrocarbon group; $Q^1$ represents a divalent linking group; $C^1$ represents a substituted or non-substituted, alkyl group, cycloalkyl group, alkoxy group, alkoxycarbonyl group, acyl group or acyloxy group; j is 0 or 1, p, q and r respectively represent an integer from 0 to 5, and n represents an integer from 1 to 3, provided that a total number of groups represented by $B^1$ and $B^2$ is from 3 to 10; in case any of p, q and r is equal to or larger than 2, $B^1$, $Q^1$ or $B^2$ present in two or more units may be same or different to each other; and, in case n is equal to or larger than 2, {(B$^1$)$_p$-(Q$^1$)$_q$-(B$^2$)$_r$} present in two or more units may be same or different to each other.

In the formula (3), "Het", $B^1$, $B^2$, $Q^1$, $C^1$, j, p, q, r and n have same preferred ranges as in the formula (2).

The substituent represented by $R^{11}$, $R^{12}$, $R^{13}$, $R^{14}$, $R^{15}$, $R^{16}$, or $R^{17}$ may be selected from Substituent Group V, and is preferably selected from the group consisting of the exemplified amino, halogen atom, hydroxy, cyano, carbamoyl, sulfamoyl, alkoxy, aryloxy, acyloxy, acylamino, ureido, imide, alkylthio, arylthio, heteroarylthio, alkoxycarbonyl, aryloxycarbonyl, alkyl, aryl and heteroaryl; and is more preferably selected from the group consisting of the exemplified amino, halogen atom, hydroxy, carbamoyl, acyloxy, acylamino, imide, alkylthio, arylthio, heteroarylthio, alkoxycarbonyl, aryloxycarbonyl, alkyl and aryl.

One preferred example is a compound of the formula (4) in which at least one of $R^{11}$, $R^{14}$, and $R^{16}$ is the group represented by -(Het)$_j$-{(B$^1$)$_p$-(Q$^1$)$_q$-(B$^2$)$_r$}$_n$-C$^1$.

Examples of the dichroic anthraquinone dye and the dichroic phenoxazine dye, which can be used in the invention, include, however not to be limited to, the compounds shown below.

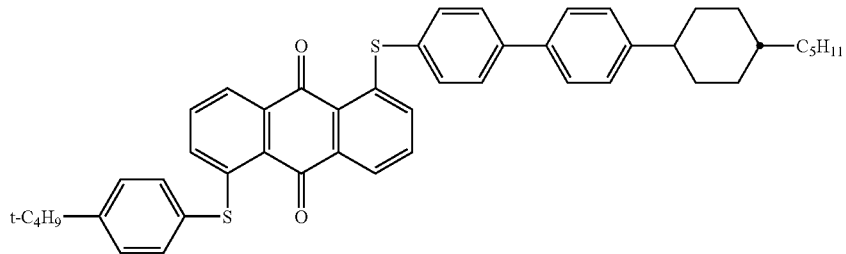
No.1-1
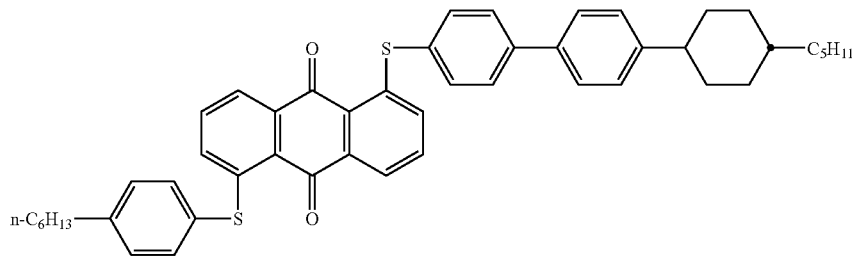
No.1-2
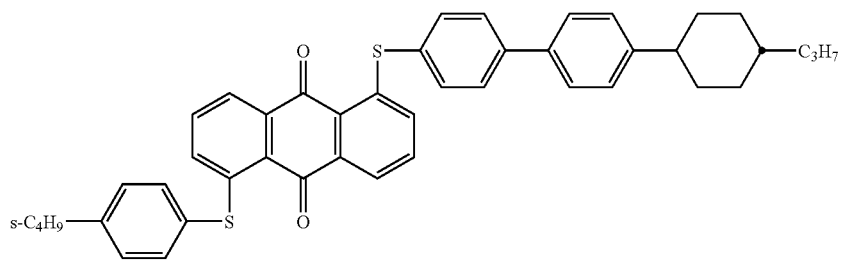
No.1-3
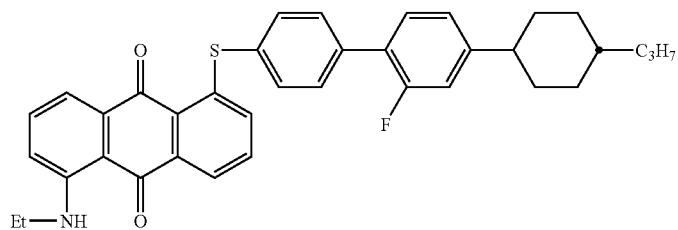
No.1-4
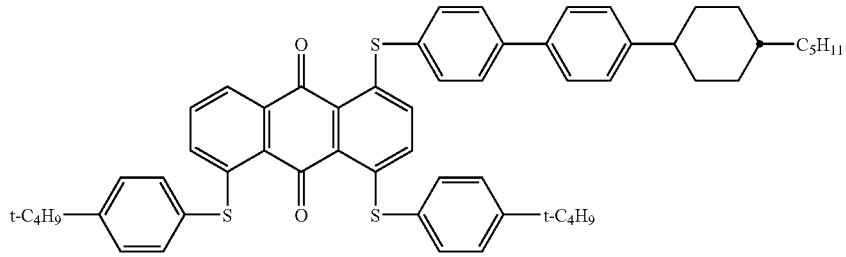
No.1-5
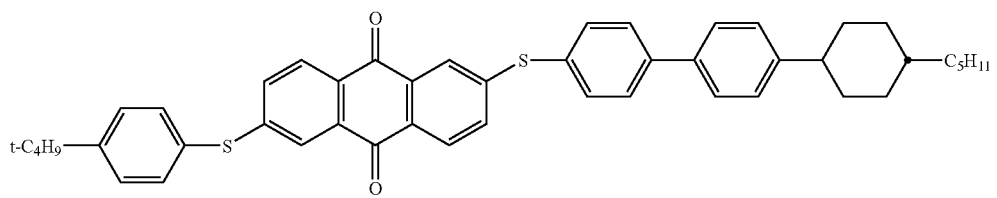
No.1-6

-continued
No.1-7
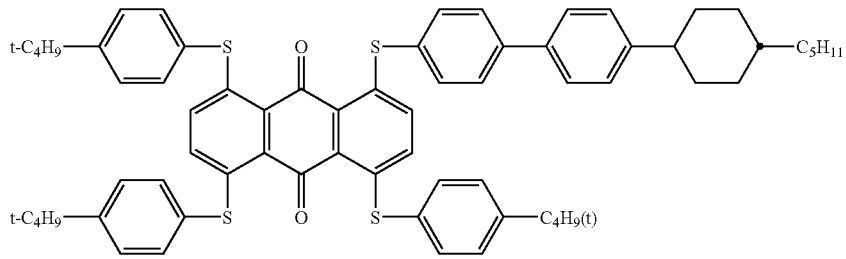
No.1-8
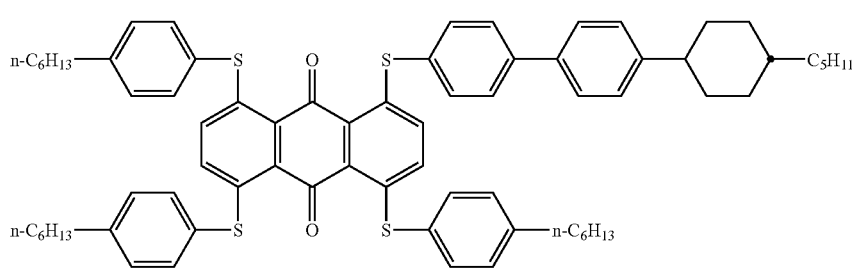
No.1-9
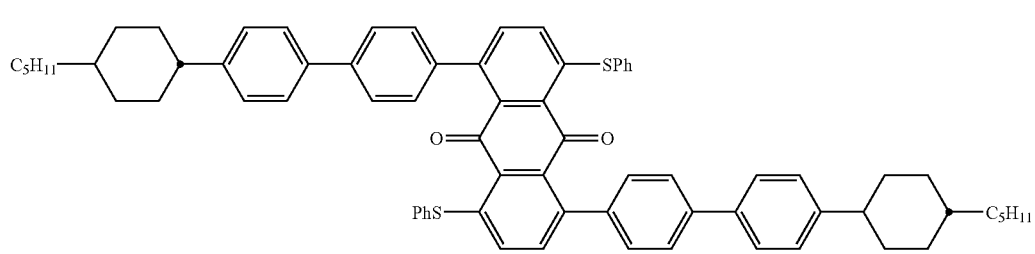
No.1-10
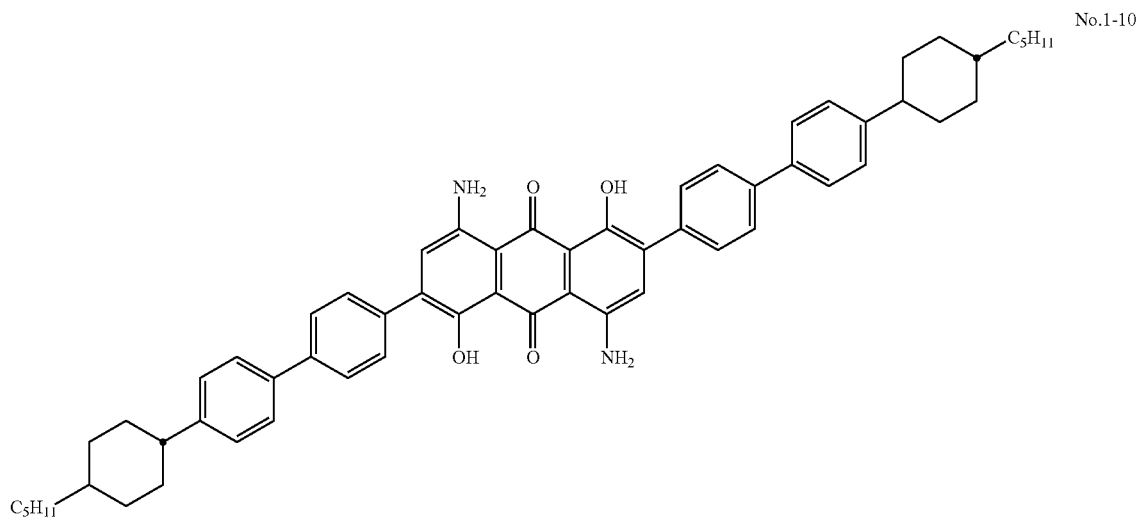
No.1-11
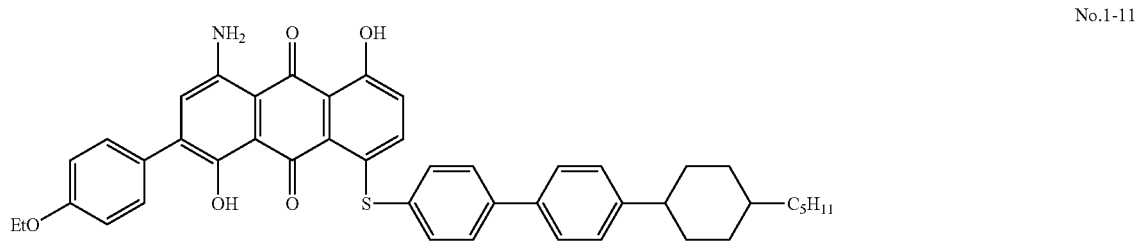

-continued
No.1-12
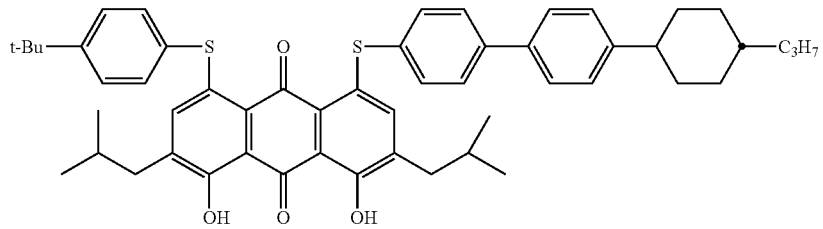
No.1-13
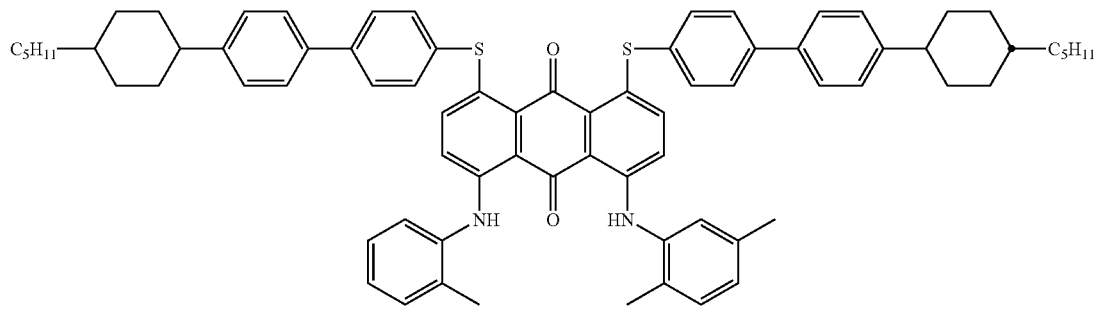
No.1-14
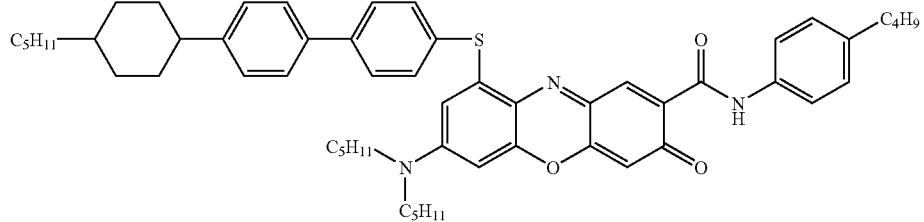
No.1-15
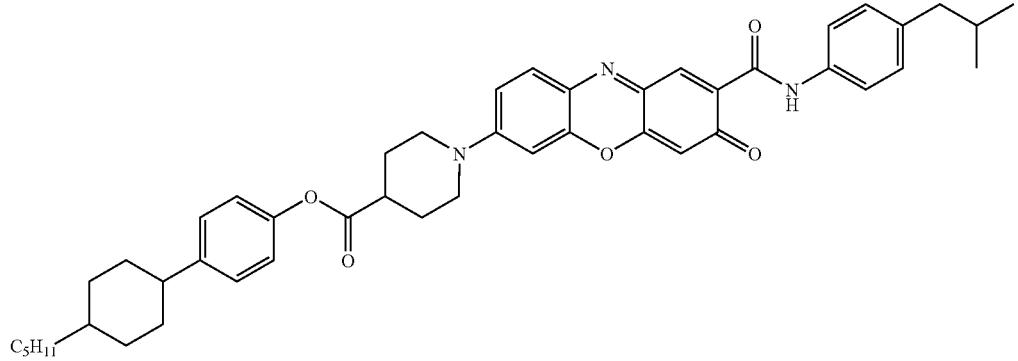
No.1-16
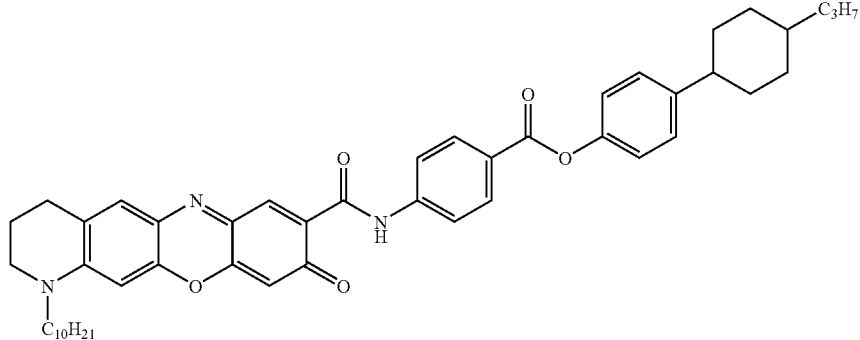

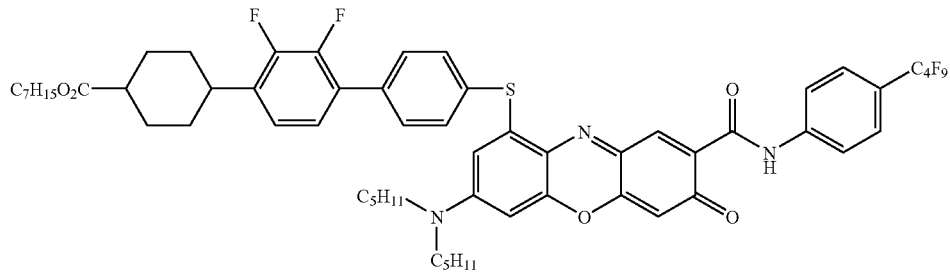
No.1-17
Examples of the dichroic azo dye, which can be used in the invention, include, however not to be limited to, the compounds shown below.
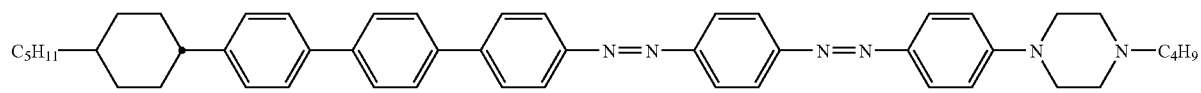
No.2-1
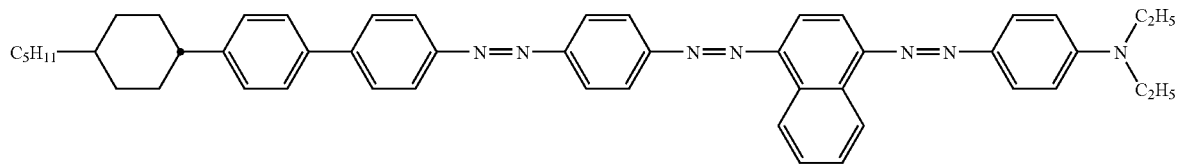
No.2-2
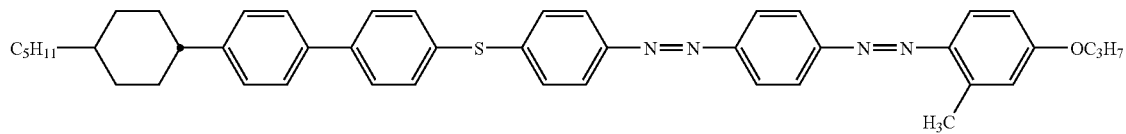
No.2-3
Examples of the dichroic dioxazine dye and the merocyanine dye, which can be used in the invention, include, however not to be limited to, the compounds shown below.
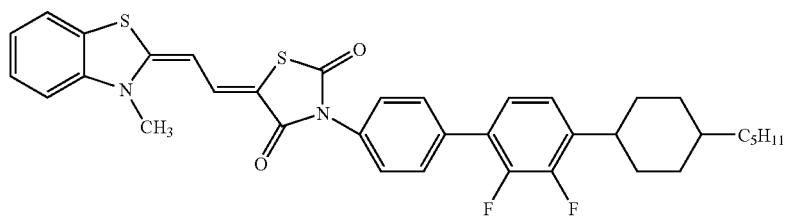
No.3-1

-continued

No.3-2

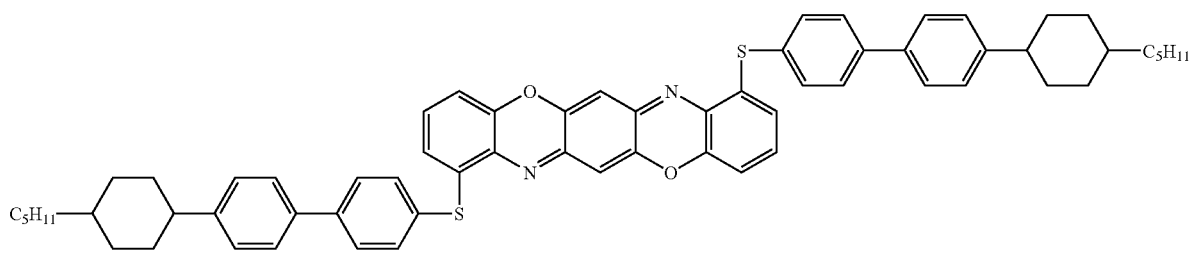

The dichroic dyes carrying a group represented by the formula (2) can be prepared according to any known process or the combination of known processes. For example, the dyes can be prepared according to the process described in Japanese Laid-Open Patent Publication "Tokkai" No. 2003-192664.

In the smectic liquid crystal composition of the invention, a ratio of the dichroic dye to the host liquid crystal, which is a mixture of a dual-frequency switchable nematic liquid crystal and a smectic liquid crystal, the term "host liquid crystal" being used with the same meaning hereinafter, is not to be limited to a specific range, and is preferably from 0.1 to 15 wt % and particularly preferably 0.5 to 6 wt %.

The dissolving of the dichroic dye into the host liquid crystal can be achieved by a mechanical agitation, a heating, an ultrasonic wave application or a combination thereof. The smectic liquid crystal composition of the invention may be prepared by employing known techniques.

[Liquid Crystal Device]

The liquid crystal device of the invention comprises a pair of electrodes of which at least one is a transparent electrode, and a layer between the pair of electrodes comprising a smectic liquid crystal composition of the invention. The embodiment of the smectic liquid crystal composition contained in the layer is not to be limited to a specific embodiment, and the layer may be formed of the smectic liquid crystal layer; may comprise a polymer and the smectic liquid crystal composition dispersed in the polymer; or may comprise microcapsules respectively comprising the smectic liquid crystal composition.

The liquid crystal composition of the invention is preferably employed in a GH-mode displaying device. A GH mode displaying device comprising a cell filled with a liquid crystal composition, prepared by dissolving dichroic dye in host liquid crystal, can generally display images without a polarizing plate, because the absorption state of the cell is changed by an electric field applied to the cell, thereby displaying images. Applying an electric field, the orientation of the host liquid crystal in the cell is changed, and the orientation of the dichroic dye is changed as well as the host liquid crystal, and, therefore, the absorption state of the cell is changed. It is generally considered that GH-mode displaying devices can display brighter images compared with other displaying devices employing a polarizing plate.

As a substrate of the electrode substrate, which can be used in the invention, is usually selected from glass or plastic substrates, is preferably selected from plastic films. Examples of the plastic films include films of acrylic polymer, polycarbonate, and epoxy based polymer. More specific examples of the substrate include triacety cellulose (TAC) films, polyethylene terephthalate (PET) films, polyethylene naphthalate (PEN) films, syndiotactic polystyrene (SPS) films, polyphenylene sulfide (PPS) films, polycarbonate (PC) films, polyarylate (PAr) films, polysulfone (PSF) films, polyester sulfone (PES) films, polyether imide (PEI) films, cyclic polyolefin films and polyimide (PI) films. The substrate is more preferably selected from polyethylene terephthalate (PET) films.

The thickness of the plastic substrate is not to be limited a specific range, and preferably from 30 μm to 700 μm, more preferably from 40 μm to 200 μm, and much more preferably from 50 μm to 150 μm. The haze of the substrate is preferably not greater than 3%, more preferably not greater than 2% and much more preferably not greater than 1%. And the optical transmittance of the substrate is preferably not lower than 70%, is more preferably not lower than 80%, and is much more preferably not lower than 90%.

One or more additives such as plasticizers, dyes, pigments, antistatic additives, ultraviolet absorbers, antioxidant agents, inorganic fine particles, peel-promoting agents, leveling agents and lubricants may be added to the plastic substrate without lowering the effect of the invention.

Transparent and untransparent plastic substrates may be used in the invention. As an untransparent plastic substrate, white substrates having light reflectivity can be used. Examples of the white substrate include plastic films containing inorganic pigments such as titanium oxide and zinc oxide. In the case that the displaying surface is a surface of the substrate, the substrate may be required to be transparent to at least visible light.

The substrate is described for example in *Liquid Crystal Device Handbook*, Japan Society for the Promotion of Science, Committee 142, p. 218-231 (1989), Published by Nikkan Kogyo Shimbun).

On at least one of the pair of substrates, there is formed an electrode layer, which is preferably an transparent electrode. The electrode layer may be formed of indium oxide, indium tin oxide (ITO), or tin oxide. The transparent electrode can for example be those described in *Liquid Crystal Device Handbook*, Japan Society for the Promotion of Science, Committee 142, p. 232-239 (1989), Published by Nikkan Kogyo Shimbun).

The transparent electrode may be formed by a sputtering method, a sol-gel method or a printing method.

The liquid crystal device of the invention is preferably provided with a layer, subjected to an alignment process for the purpose of aligning the liquid crystal, on a surface of the substrate in contact with the liquid crystal. Such alignment process may be carried out by coating and aligning a quaternary ammonium salt, by coating polyimide and rubbing a surface of the polyimide layer, by an oblique evaporation of SiO$_2$, or by a light irradiation utilizing photoisomerization. An alignment film can for example be those described in *Liquid Crystal Device Handbook*, Japan Society for the Promotion of Science, Committee 142, p. 240-256 (1989), Published by Nikkan Kogyo Shimbun).

It is to be noted that, according to the liquid crystal device of the invention, it is possible to carry out the switching of the orientation of the liquid crystal only with variation of applying voltage without an alignment layer, because it employs the dual-frequency switchable smectic liquid crystal composition of the invention. And, thus, the liquid crystal device of the invention may comprise or not comprise an alignment layer, and the liquid crystal device without an alignment layer has advantages to be simplified its structure and to be free from lowering of the display properties due to the presence of an alignment layer.

The liquid crystal device of the invention can be produced by forming a gap of 1 to 50 μm between the substrates for example by means of a spacer, and filling the gap with the liquid crystal composition of the invention. The employable spacer is described for example in *Liquid Crystal Device Handbook*, Japan Society for the Promotion of Science, Committee 142, p. 257-262 (1989), Published by Nikkan Kogyo Shimbun). The liquid crystal composition of the invention can be provided in a space between the substrates, by coating or printing on the substrate.

The liquid crystal device of the invention can be driven by a simple matrix drive method, or by an active matrix drive method utilizing for example a thin film transistor (TFT). Such drive methods are described in detail for example in *Liquid Crystal Device Handbook*, Japan Society for the Promotion of Science, Committee 142, p. 387-460 (1989), Published by Nikkan Kogyo Shimbun), and can be utilized for driving the liquid crystal device of the invention.

For driving the liquid crystal device of the invention, voltages of a low frequency region and a high frequency region may be employed. A frequency range of the voltage to be applied to the liquid crystal layer is variable depending on a type of the liquid crystal to be employed, and a cross-over frequency of such liquid crystal, but, in general, is preferably within a range of 0.1 Hz to 10 MHz, and more preferably 1 Hz to 1 MHz. A frequency in the low frequency region is preferably 0.1 Hz to 100 kHz, more preferably 1 Hz to 10 kHz and further preferably 10 Hz to 10 kHz. Also a frequency in the high frequency region is preferably 100 Hz to 10 MHz, more preferably 100 Hz to 1 MHz and further preferably 1 kHz to 1 MHz.

The liquid crystal display utilizing the liquid crystal device of the invention may be of any type. And the liquid crystal device of the invention is applicable to a laminated GH mode described for example in JPA Nos. 10-67990, 10-239702, 10-133223, 10-339881, 11-52411, 11-64880 and 2000-221538 (the term "JPA" as used herein means an "unexamined published Japanese patent application (Kohkai Tokkyo Kohou)"). The liquid crystal device of the invention is also applicable to a GH mode utilizing microcapsules as described in JPA No. 11-24090. Thus, an embodiment of the liquid crystal device of the invention is a GH mode liquid crystal device having a liquid crystal layer between a pair of electrodes of which at least either is a transparent electrode, wherein the liquid crystal layer includes microcapsules containing the liquid crystal composition of the invention. Furthermore, liquid crystal device of the invention is applicable to a GH mode of polymer dispersed liquid crystal type, as described in JPA Nos. 5-61025, 5-265053, 6-3691, 6-23061, 5-203940, 6-242423, 6-289376, 8-278490 and 9-813174. Thus, an embodiment of the liquid crystal device of the invention is a GH mode liquid crystal device of polymer dispersed liquid crystal type, having a polymer medium layer between a pair of electrodes of which at least either is a transparent electrode, wherein the polymer medium layer includes a polymer, and a liquid crystal composition of the invention dispersed in the polymer.

The liquid crystal device of the invention may utilize a liquid crystal composition containing plural dichroic dyes. Also the liquid crystal composition may have any color. Also in case of forming a black-colored liquid crystal composition for example by mixing plural dichroic dyes, it can be utilized in a liquid crystal device for displaying white and black colors by a voltage application. It is also possible to prepare a liquid crystal device for color display by preparing liquid crystal compositions colored in red, green and blue and arranging such three compositions in parallel manner on a substrate. Also the liquid crystal device of the invention may have a laminate structure. For example there can be employed a three-layered structure respectively formed by yellow-, magenta- and cyan-colored liquid crystal compositions; a two-layered structure constituted of a layer formed by a parallel arrangement of yellow, magenta and cyan colored liquid crystal compositions and a layer formed by a parallel arrangement of liquid crystal compositions of complementary colors of blue, green and red; and a two-layered structure constituted of a layer of a black-colored liquid crystal composition and a layer formed by a parallel arrangement of liquid crystal compositions of blue, green and red.

EXAMPLES

The following examples further illustrate the present invention. The materials, reagents, amounts and proportions thereof, procedures or the like shown in the following examples can be appropriately changed without departing from the spirit of the present invention. Therefore, the scope of the present invention is not limited to the specific examples shown below.

Example 1

(Synthesis. No. 1 of Smectic Liquid Crystal)

Smectic liquid crystal (1) was prepared according to a scheme shown below.

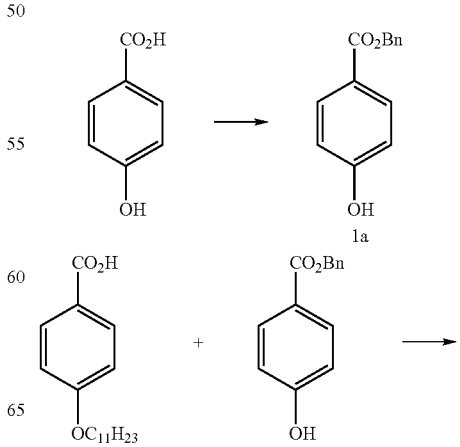

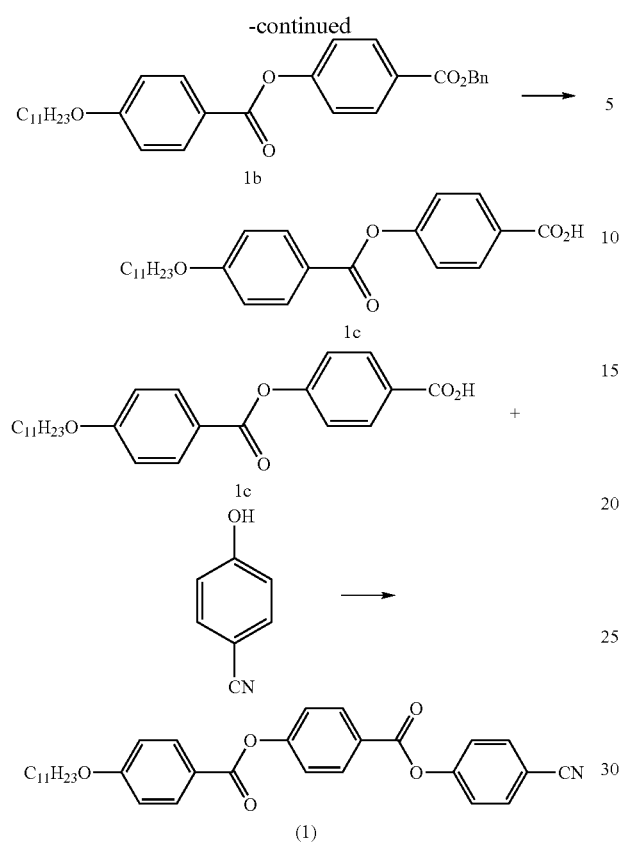

(Synthesis of Compound 1a)

A 600 ml of acetonitrile solution of 4-hydroxy benzoic acid (30 g) (manufactured by TOKYO CHEMICAL INDUSTRY CO., LTD.) and CsF-Celite (109.4 g), which was prepared according to a method described in SYNTHETIC COMMUNICATIONS, 28(11), 2021-2026 (1998) was added dropwise with 74.3 g of benzyl bromide, and was stirred under reflux for three hours. The reaction solution was condensed under reduced pressure, added with 500 ml of ethyl acetate, and filtered. The filtrate was condensed under reduced pressure, and the condensed residue was recrystallized in a mixed solvent of water and methanol to yield a crude crystal. The crude crystal was recrystallized in toluene to yield 31 g of Compound 1a.

(Synthesis of Compound 1b)

A 50 ml of methylene chloride of Compound 1a (4 g) and 4-n-undecyloxy benzoic acid (5.1 g) (manufactured by TOKYO CHEMICAL INDUSTRY CO., LTD.), was added dropwise with a 30 ml of methylene chloride solution of dicyclo carbodiimide (4.3 g), and was stirred under reflux for one hour. The reaction solution was poured into a mixture of ethyl acetate and hydrochloric acid (1 N), and separated into an organic layer and a water layer. The organic layer was washed with hydrochloric acid (1 N), dried with magnesium sulfate, and condensed under reduced pressure. The condensed residue was purified with silica gel chromatography (developing solvent: a mixed solvent of ethyl acetate and hexane (1/5)), to yield Compound 1b (7.4 g).

(Synthesis of Compound 1c)

The mixed solution of a 70 ml of isopropyl alcohol and a 10 ml of tetrahydrofuran (THF) of Compound 1b (7 g) was added with 10% Pd/C (1.0 g), and stirred under atmospheric pressure with hydrogen addition for four hours. The reaction solution was filtered through sellite, and condensed under reduced pressure. The condensed residue was recrystallized in isopropyl alcohol to yield 5.0 g of Compound 1c.

(Synthesis of Smectic Liquid Crystal (1))

A 50 ml of chloroform solution of Compound 1c (2.0 g), 4-cyano phenol (0.58 g) (manufactured by TOKYO CHEMICAL INDUSTRY CO., LTD.) and dimethylamino pyridine (0.12 g) was added dropwise with a 10 ml of methylene chloride solution of dicyclohexyle carbodiimide (1.2 g), and stirred under reflux for one hour. The reaction solution was poured into a mixture of chloroform and hydrochloric acid (1 N), and separated into an organic layer and a water layer. The organic layer was washed with hydrochloric acid (1 N), dried with magnesium sulfate, and condensed under reduced pressure. The condensed residue was purified with silica gel chromatography (developing solvent: chloroform), to yield a crude crystal. The crude crystal was recrystallized in isopropyl alcohol to yield 2.0 g of Smectic Liquid Crystal (1). The compound was identified by element analysis, NMR measurement and mass spectrum measurement. The appearance of the compound was a white solid. Measuring the transition temperatures of Smectic Liquid Crystal (1), it was found that a transition temperature from a crystal phase to a smectic A phase was 107° C. and a transition temperature from a smectic A phase to an isotropic phase was 199° C.

Anisotropy of Refractive Index $\Delta n$:

$\Delta n$=0.23 (the value was calculated by an extrapolation sing liquid crystal "ZLI-1132" manufactured by Merck & Co., Ltd.)

$^1$H-NMR (CDCl$_3$)

$\delta$:0.88(3H,t), 1.28(14H,m), 1.49(2H,m), 1.83(2H,m), 4.05 (2H,t), 7.02(2H,d), 7.39(4H,m), 7.76(2H,d), 8.15(2H, d), 8.28(2H,d).

(Synthesis No. 2 of Smectic Liquid Crystal)

Other smectic liquid crystals shown in TABLE 1 were prepared according to known methods.

TABLE 1

(Evaluation of Properties)

| Smectic Liquid Crystal | Transition Temperature | $\Delta n$ |
| --- | --- | --- |
| 2 | Cr 102 SmA 215 Iso | 0.233 |
| 3 | Cr 117 SmA 178 Iso | — |
| 4 | Cr 119 SmA 175 Iso | — |
| 5 | Cr 85 (SmC 105) SmA 208 Iso | — |
| 7 | Cr 85 SmC 86.9 SmA 160 N 174 Iso | — |
| 8 | Cr 123 SmA 200 N 209 Iso | — |
| 9 | Cr 101 SmA 194 N 198 Iso | 0.232 |
| 13 | Cr 75 SmA 101.6 N 113 Iso | — |

Cr: crystal,
SmA: smectic A phase,
N: nematic phase, and
Iso: isotropic phase.

(Synthesis of Dichroic Dye)

Dichroic Dye (1-8) was prepared according to the method described in Japanese Laid-Open Patent Publication "Tokkai" No. 2003-192664.

Dichroic Dye (1-14) was prepared according to the method described in Japanese Laid-Open Patent Publication "Tokkai" No. 2005-120334.

Example 2

(Preparation of Liquid Crystal Composition No. 1)

A mixture of 5 mg of Dichroic Liquid Crystal (1-8), 14.8 mg of Smectic Liquid Crystal (1), 75.8 mg of Dual-frequency Switchable Nematic Liquid Crystal (H-1), which is described in Applied Physics Letters, Vol. 25, 186-188 (1974), and 9.4 mg of Liquid Crystal (H-2), having a negative $\Delta\epsilon$, was heated on a hot plate of 180° C. for one hour, cooled down to a room temperature, and left overnight. Thus, Liquid Crystal Composition No. 1 was obtained.

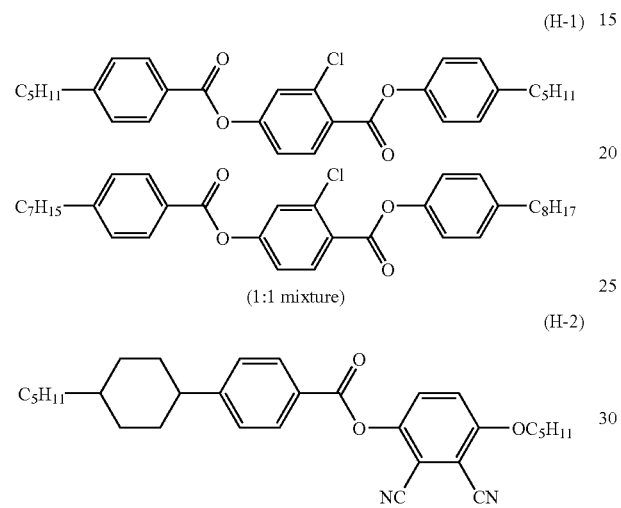

(Preparation of Liquid Crystal Composition No. 2)

Liquid Crystal Composition No. 2 was prepared in the same manner as Liquid Crystal Composition No. 1, except that 1 mg of Dichroic Dye (1-14) was used in the place of 5 mg of Dichroic Dye (1-8).

(Preparation of Liquid Crystal Composition No. 3)

Liquid Crystal Composition No. 3 was prepared in the same manner as Liquid Crystal Composition No. 1, except that Smectic Liquid Crystal (5) was used in the place of Smectic Liquid Crystal (1).

(Preparation of Liquid Crystal Composition No. 4)

Liquid Crystal Composition No. 4 was prepared in the same manner as Liquid Crystal Composition No. 3, except that 1 mg of Dichroic Dye (1-14) was used in the place of 5 mg of Dichroic Dye (1-8).

(Preparation of Liquid Crystal Composition No. 5)

A mixture of 5 mg of Dichroic Liquid Crystal (1-8), 9.7 mg of Smectic Liquid Crystal (3), 9.9 mg of Smectic Liquid Crystal (4), 80.4 mg of Dual-frequency Switchable Nematic Liquid Crystal (H-1) was heated on a hot plate of 180° C. for one hour, cooled down to a room temperature, and left overnight. Thus, Liquid Crystal Composition No. 5 was obtained.

(Preparation of Liquid Crystal Composition No. 6)

Liquid Crystal Composition No. 6 was prepared in the same manner as Liquid Crystal Composition No. 5, except that 1 mg of Dichroic Dye (1-14) was used in the place of 5 mg of Dichroic Dye (1-8).

(Preparation of Liquid Crystal Composition Nos. 7 and 8 for Comparison)

Liquid Crystal Composition No. 7 was prepared in the same manner as Liquid Crystal Composition No. 1, except that only 100 mg of dual-frequency switchable Nematic Liquid Crystal (H-1) was used as host liquid crystal. This composition was prepared for comparison.

Liquid Crystal Composition No. 8 was prepared in the same manner as Liquid Crystal Composition No. 7, except that 1 mg of Dichroic Dye (1-14) was used in the place of 5 mg of Dichroic Dye (1-8). This composition was prepared for comparison.

Example 3

(Production of Liquid Crystal Device)

Each of Liquid crystal device Nos. A to H was produced by pouring each of Liquid Crystal Composition Nos. 1 to 8 in a commercially available liquid crystal cell at 180° C. The liquid crystal cell employed was a glass substrate (thickness of 0.7 mm) manufactured by E.H.C. and having an ITO transparent electrode layer, and had a cell gap of 8 μm and an epoxy resin seal. It is to be noted that any alignment layer was not formed on the ITO transparent electrode layer.

<Evaluation of Dual-Frequency Switching Ability and Memory Ability (Bistability)>

Applying a square wave AC voltage with low frequency (100V, 100 Hz) to each of Liquid crystal device Nos. A to H, the optical transmittance was measured using a spectrometer, "UV-2400PC" manufacture by Shimazu Corporation. Next, applying a square wave AC voltage with high frequency (100V, 100 kHz) to each of Liquid crystal device Nos. A to H, the optical transmittance was measured in the same manner. Each of liquid crystal devices was allowed to stand for a week after turning off the square wave AC voltage, and the variation of the optical transmittance was measured to evaluate its memory ability (bistability). The evaluation "O" means that no variation in optical transmittance was found, and the evaluation "x" means that variation in optical transmittance was found.

The obtained results are shown in TABLE 2.

TABLE 2

| Liquid Crystal Device | Liquid Crystal Composition | Abs (100 Hz) | Abs (100 kHz) | Memory Ability | Note |
|---|---|---|---|---|---|
| A | 1 | 0.10 | 0.94 | O | Invention |
| B | 2 | 0.11 | 1.07 | O | Invention |
| C | 3 | 0.11 | 0.98 | O | Invention |
| D | 4 | 0.12 | 1.02 | O | Invention |
| E | 5 | 0.12 | 0.93 | O | Invention |
| F | 6 | 0.12 | 0.98 | O | Invention |
| G | 7 | 0.14 | 0.73 | X | For comparison |
| H | 8 | 0.14 | 0.76 | X | For comparison |

From the results shown in TABLE 2, it is understandable that Liquid Crystal Device Nos. A to F gave a higher contrast ratio compared with comparative examples, Liquid Crystal Device Nos. G and H; and Liquid Crystal Device Nos. A to F could store image information.

INDUSTRIAL APPLICABILITY

The smectic liquid crystal composition of the invention can be employed widely in producing liquid crystal devices, is especially suitable for being employed in producing GH-mode liquid crystal devices. The GH-mode liquid crystal device employing the liquid crystal composition of the invention can have a high displaying contrast and capable of storing image information.

The invention claimed is:

1. A smectic liquid crystal composition comprising, at least, a dichroic dye, a dual-frequency switchable nematic liquid crystal and a smectic liquid crystal,
   wherein a dielectric anisotropy of the composition changes from a positive value to a negative value with increasing a frequency of an electric field applied to the composition.

2. The smectic liquid crystal composition of claim 1, wherein the smectic liquid crystal is dual-frequency switchable.

3. The smectic liquid crystal composition of claim 1, wherein, being applied a field, a dielectric anisotropy of the smectic liquid crystal changes from a positive value to a negative value with increasing a frequency of an applied electric field.

4. The smectic liquid crystal composition of claim 1, wherein the smectic liquid crystal is a compound presented by a following formula (1):

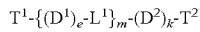

$$T^1\text{-}\{(D^1)_e\text{-}L^1\}_m\text{-}(D^2)_k\text{-}T^2 \qquad \text{Formula (1)}$$

where $D^1$ and $D^2$ respectively represent a substituted or non-substituted, arylene group, a heteroarylene group or a divalent cycloaliphatic hydrocarbon group; $L^1$ represents a divalent linking group, $T^1$ and $T^2$ respectively represent a substituted or non-substituted, alkyl group, alkoxy group, alkoxycarbonyl group, acyl group or acyloxy group, or a halogen atom or a cyano; "e" is an integer from 1 to 3, "m" is an integer from 1 to 3, and "k" is 1 or 2, provided that a total number of $D^1$ and $D^2$ is from 3 to 5; when "e" or "k" is more than 2, a plural $D^1$ or $D^2$ may be same or different to each other; and when "m" is more than 2, a plural $\{(D^1)_e\text{-}L^1\}$ may be same or different to each other.

5. The smectic liquid crystal composition of claim 1, capable of transforming to a smectic A phase.

6. The smectic liquid crystal composition of claim 1, wherein the dichroic dye is a compound having at least one group represented by a following formula (2):

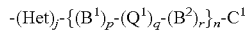

$$\text{-(Het)}_j\text{-}\{(B^1)_p\text{-}(Q^1)_q\text{-}(B^2)_r\}_n\text{-}C^1 \qquad \text{Formula (2)}$$

where "Het" represents an oxygen atom or a sulfur atom; $B^1$ and $B^2$ respectively represent a substituted or non-substituted arylene group, heteroarylene group or divalent cycloaliphatic hydrocarbon group; $Q^1$ represents a divalent linking group; $C^1$ represents a substituted or non-substituted, alkyl group, cycloalkyl group, alkoxy group, alkoxycarbonyl group, acyl group or acyloxy group; j is 0 or 1, p, q and r respectively represent an integer from 0 to 5 and n represents an integer from 1 to 3, provided that a total number of groups represented by $B^1$ and $B^2$ in the formula (2) is from 3 to 10; in case any of p, q and r is equal to or larger than 2, $B^1$, $Q^1$ or $B^2$ present in two or more units may be same or different to each other; and, in case n is equal to or larger than 2, $\{(B^1)_p\text{-}(Q^1)_q\text{-}(B^2)_r\}$ present in two or more units may be same or different to each other.

7. The smectic liquid crystal composition of claim 6, wherein, in the formula (2), "Het" is s sulfur atom.

8. The smectic liquid crystal composition of claim 6, wherein, in the formula (2), "Het" is a sulfur atom, $B^1$ is a substituted or non-substituted arylene or heteroarylene group, $B^2$ is a cyclohexane-1,4-diyl group, $C^1$ is a substituted or non-substituted alkyl group, j=1, p=2, q=0, r=1 and n=1.

9. The smectic liquid crystal composition of claim 6, wherein, in the formula (2), "Het" is a sulfur atom, $B^1$ is a substituted or non-substituted arylene or heteroarylene group, $B^2$ is a cyclohexane-1,4-diyl group, $C^1$ is a substituted or non-substituted alkyl group, j=1, p=1, q=0, r=2 and n=1.

10. The liquid crystal composition of claim 1, wherein the dichroic dye is a compound having at least one group represented by a following formula (a-1) or a formula (a-2);

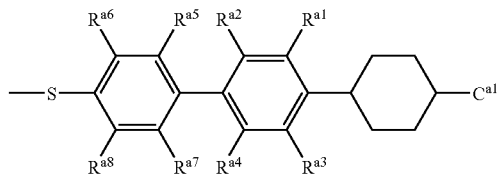

Formula (a-1)

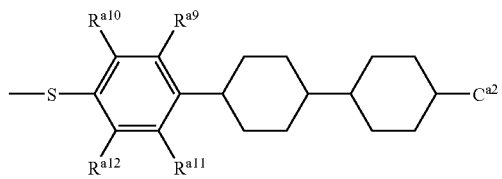

Formula (a-2)

wherein S is a sulfur atom, $R^{a1}$, $R^{a2}$, $R^{a3}$, $R^{a4}$, $R^{a5}$, $R^{a6}$, $R^{a7}$, $R^{a8}$, $R^{a9}$, $R^{a10}$, $R^{a11}$ and $R^{a12}$ respectively represent a hydrogen atom or a substituent group; and $C^{a1}$ and $C^{a2}$ respectively represent a substituted or non-substituted alkyl group.

11. The smectic liquid crystal composition of claim 1, wherein the dichroic dye is selected from the group consisting of azo dyes, anthraquinone dyes and phenoxazine dyes.

12. The smectic liquid crystal composition of claim 1, wherein the dichroic dye is a compound represented by a formula (3):

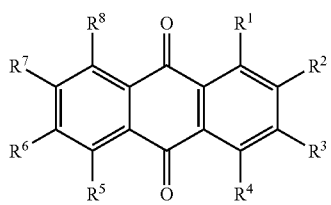

Formula (3)

where $R^1$, $R^2$, $R^3$, $R^4$, $R^5$, $R^6$, $R^7$ and $R^8$ respectively represent a hydrogen atom or a substituent group, provide that at least one is a group represented by -(Het)$_j$-{(B$^1$)$_p$-(Q$^1$)$_q$-(B$^2$)$_r$}$_n$-C$^1$, in which "Het" represents an oxygen atom or a sulfur atom, $B^1$ and $B^2$ respectively represent a substituted or non-substituted arylene group, heteroarylene group or divalent cycloaliphatic hydrocarbon group; $Q^1$ represents a divalent linking group; $C^1$ represents a substituted or non-substituted, alkyl group, cycloalkyl group, alkoxy group, alkoxycarbonyl group, acyl group or acyloxy group; j is 0 or 1, p, q and r respectively represent an integer from 0 to 5 and n represents an integer from 1 to 3, provided that a total number of groups represented by $B^1$ and $B^2$ is from 3 to 10; in case any of p, q and r is equal to or larger than 2, $B^1$, $Q^1$ or $B^2$ present in two or more units may be same or different to each other; and, in case n is equal to or larger than 2, $\{(B^1)_p\text{-}(Q^1)_q\text{-}(B^2)_r\}$ present in two or more units may be same or different to each other.

13. The smectic liquid crystal composition of claim 1, wherein the dichroic dye is a compound represented by a formula (4):

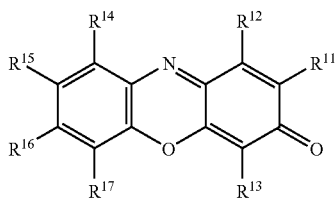

Formula (4)

where $R^{11}$, $R^{12}$, $R^{13}$, $R^{14}$, $R^{15}$, $R^{16}$, and $R^{17}$ respectively represent a hydrogen atom or a substituent group, provided that at least one is a group represented by -(Het)$_j$-$\{(B^1)_p\text{-}(Q^1)_q\text{-}(B^2)_r\}_n$-$C^1$, in which "Het" represents an oxygen atom or a sulfur atom, $B^1$ and $B^2$ respectively represent a substituted or non-substituted arylene group, heteroarylene group or divalent cycloaliphatic hydrocarbon group; $Q^1$ represents a divalent linking group; $C^1$ represents a substituted or non-substituted alkyl group, cycloalkyl group, alkoxy group, alkoxycarbonyl group, acyl group or acyloxy group; j is 0 or 1, p, q and r respectively represent an integer from 0 to 5, and n represents an integer from 1 to 3, provided that a total number of groups represented by $B^1$ and $B^2$ is from 3 to 10; in case any of p, q and r is equal to or larger than 2, $B^1$, $Q^1$ or $B^2$ present in two or more units may be same or different to each other; and, in case n is equal to or larger than 2, $\{(B^1)_p\text{-}(Q^1)_q\text{-}(B^2)_r\}$ present in two or more units may be same or different to each other.

14. A liquid crystal device comprising:
a pair of electrodes of which at least one is a transparent electrode, and
a layer between the pair of electrodes comprising a smectic liquid crystal composition as set forth in claim 1.

15. The liquid crystal device of claim 14, wherein the layer comprises a polymer and the smectic liquid crystal composition dispersed in the polymer.

16. The liquid crystal device of claim 14, wherein the layer comprises microcapsules respectively comprising the smectic liquid crystal composition.

* * * * *